US012228880B2

(12) United States Patent
Hashimoto

(10) Patent No.: US 12,228,880 B2
(45) Date of Patent: Feb. 18, 2025

(54) IMAGE FORMING APPARATUS

(71) Applicant: CANON KABUSHIKI KAISHA, Tokyo (JP)

(72) Inventor: Naoki Hashimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/461,751

(22) Filed: Sep. 6, 2023

(65) Prior Publication Data

US 2024/0103434 A1 Mar. 28, 2024

(30) Foreign Application Priority Data

Sep. 27, 2022 (JP) ................................. 2022-153984

(51) Int. Cl.
*G03G 21/20* (2006.01)
*G03G 15/04* (2006.01)

(52) U.S. Cl.
CPC ..... *G03G 21/206* (2013.01); *G03G 15/04036* (2013.01)

(58) Field of Classification Search
CPC ....................... G03G 21/206; G03G 15/04036
See application file for complete search history.

(56) References Cited

U.S. PATENT DOCUMENTS

| | | | | |
|---|---|---|---|---|
| 6,308,024 B1 * | 10/2001 | Nakayama | ........... | G03G 21/206 399/92 |
| 2013/0016992 A1 * | 1/2013 | Watanabe | ............ | G03G 21/206 399/92 |
| 2016/0070230 A1 * | 3/2016 | Kokubu | ............... | G03G 21/206 399/92 |

FOREIGN PATENT DOCUMENTS

| | | |
|---|---|---|
| JP | 2007140349 A | 6/2007 |

* cited by examiner

*Primary Examiner* — Sandra Brase
(74) *Attorney, Agent, or Firm* — ROSSI, KIMMS & McDOWELL LLP

(57) ABSTRACT

An image forming apparatus includes a photoreceptor; an exposure portion configured to include a substrate having a plurality of light emitting portions arranged along a rotation axis direction of the photoreceptor and exposes the photoreceptor to form a latent image on the photoreceptor; a development portion configured to develop a latent image formed on the photoreceptor with toner; an exposure duct configured to guide the airflow generated by a first fan along a longitudinal direction of the substrate; a development duct configured to guide the airflow generated by a second fan along the rotation axis direction of the development portion; and a first duct communicating with the exposure duct and the development duct, the first duct configured to exhaust air introduced from the exposure duct and exhaust air introduced from the development duct.

8 Claims, 23 Drawing Sheets

C-C

X-X

X-X

Y3-Y3

IMAGE FORMING APPARATUS

BACKGROUND OF THE INVENTION

Field of the Invention

The present invention relates to an image forming apparatus including an exposure head that exposes a photoreceptor.

Description of the Related Art

Conventionally, a technique described in Japanese Patent Application Laid-Open No. 2007-140349 is known as a technique related to an exposure head used in an electrophotographic system image forming apparatus.

In Japanese Patent Application Laid-Open No. 2007-140349, an exposure head of an LED array system in which a plurality of light emitting elements is arranged along an axial direction of a photoreceptor is used as an exposure head that forms a latent image on the photoreceptor.

The exposure head includes a light emitting diode (LED) as a light emitting element. Alternatively, some light emitting elements include organic electro luminescence (EL). The organic EL may be referred to as an organic light emitting diode (OLED).

In general, the exposure head including the light emitting element needs to be disposed close to the surface of the photoreceptor. Therefore, also in Japanese Patent Application Laid-Open No. 2007-140349, the exposure head is disposed close to the photoreceptor together with the development device that develops the latent image formed on the photoreceptor with the toner. Therefore, the exposure head is disposed close to the development device.

It is known that the exposure head including the light emitting element dissipates heat according to the emitted light quantity Since the exposure head is disposed close to a development device using toner, a cooling portion is often required in order to suppress the influence of heat from the exposure head on the toner.

Japanese Patent Application Laid-Open No. 2007-140349 discloses a configuration in which an airflow is formed in a space between an exposure head and a development device as a cooling portion of the exposure head. However, in the configuration described in Japanese Patent Application Laid-Open No. 2007-140349, an airflow is also formed around the development device. Therefore, the airflow for cooling the exposure head scatters the toner of the development device disposed close to the exposure head inside the image forming apparatus.

In order to suppress scattering of toner inside the image forming apparatus, it is conceivable to provide a cooling portion of the exposure head separately from the cooling portion of the development device. However, in a case where the cooling portion is separately provided, there is a problem that the configuration of the image forming apparatus becomes complicated.

SUMMARY OF THE INVENTION

A typical configuration of the present invention includes: a rotating photoreceptor; an exposure portion configured to include a substrate having a plurality of light emitting portions arranged along a rotation axis direction of the photoreceptor and exposes the photoreceptor to form a latent image on the photoreceptor; a development portion configured to develop a latent image formed on the photoreceptor with toner; a first fan configured to generate an airflow for cooling the exposure portion; an exposure duct configured to guide the airflow generated by the first fan along a longitudinal direction of the substrate; a second fan configured to generate an airflow for cooling the development portion; a development duct configured to guide the airflow generated by the second fan along the rotation axis direction of the development portion; and a first duct communicating with the exposure duct and the development duct, the first duct configured to exhaust air introduced from the exposure duct and exhaust air introduced from the development duct.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. Note that the dimensions, materials, shapes, relative arrangements, and the like of the components described below are not intended to limit the scope of the present invention only to them unless otherwise specified.

(Image Forming Apparatus)

Figure 1:
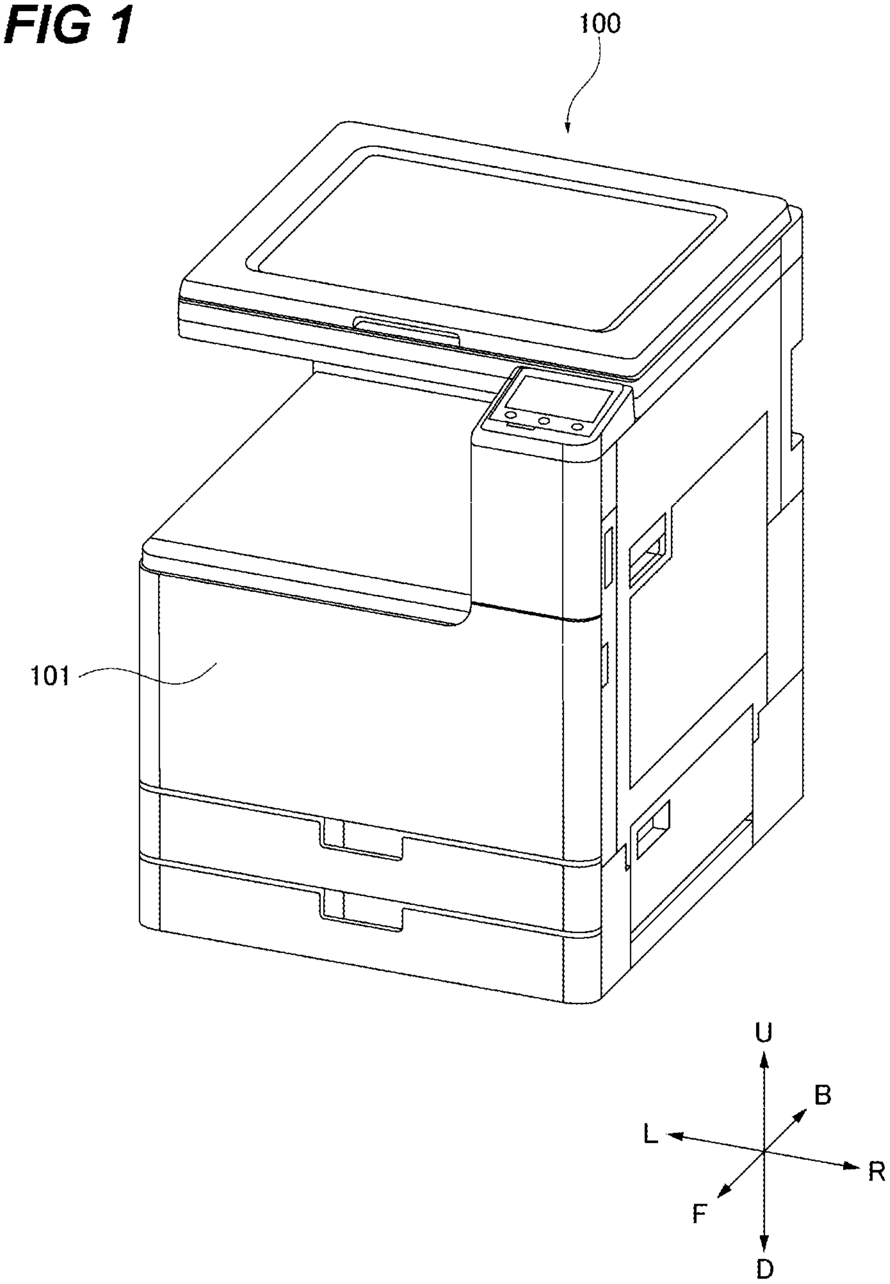
FIG. 1 is a perspective view of an image forming apparatus.
Figure 2:
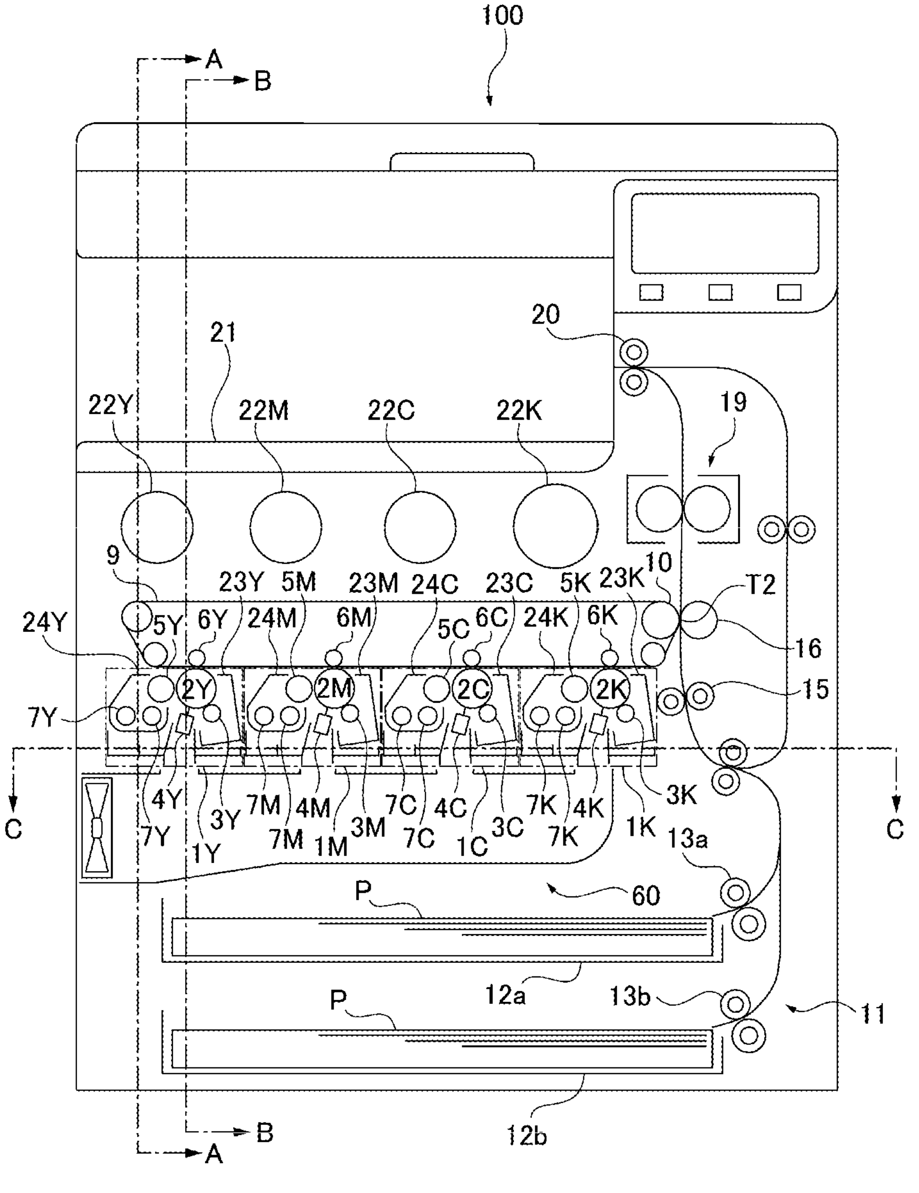
FIG. 2 is a schematic cross-sectional view of the image forming apparatus in FIG. 1.
Figure 3:
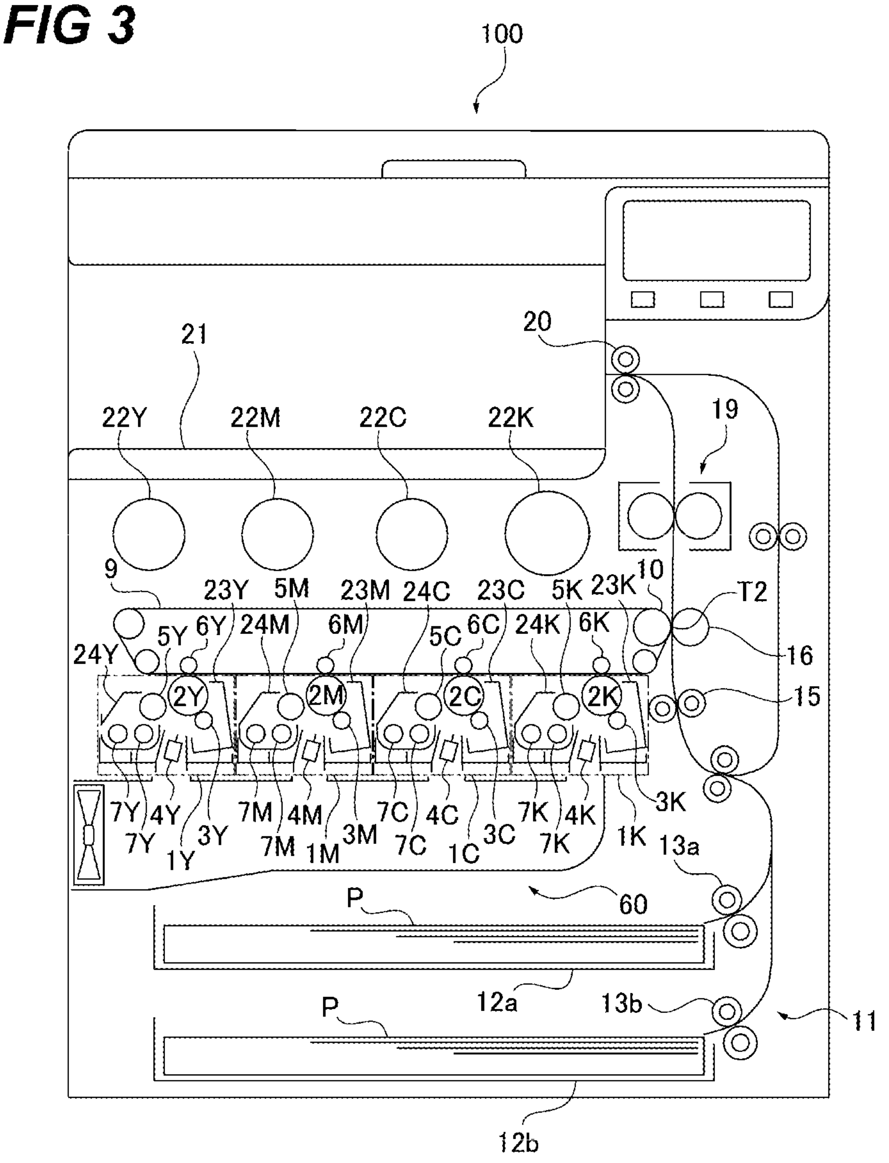
FIG. 3 is a schematic cross-sectional view of the image forming apparatus in FIG. 1.

First, a schematic configuration of an image forming apparatus 100 will be described with reference to FIGS. 1, 2, and 3. FIG. 1 is a perspective view of the image forming apparatus 100. FIGS. 2 and 3 are schematic cross-sectional views of the image forming apparatus in FIG. 1. The image forming apparatus 100 illustrated in FIGS. 1 to 3 is a copying machine including a reading device, but the embodiment may be another image forming apparatus such as a printer not including a reading device. In addition, the embodiment is not limited to a color image forming apparatus including a plurality of photosensitive drums 2 as illustrated in FIGS. 2 and 3, and may be a color image forming apparatus including one photosensitive drum 2 or an image forming apparatus that forms monochrome images.

The image forming apparatus 100 illustrated in FIGS. 2 and 3 includes four image forming portions 1Y, 1M, 1C, and 1K (hereinafter, also collectively and simply referred to as "image forming portions 1") that form toner images of respective colors of yellow, magenta, cyan, and black.

In addition, the image forming portions 1Y, 1M, 1C, and 1K respectively include photosensitive drums 2Y, 2M, 2C, and 2K (hereinafter, also collectively and simply referred to as "photosensitive drums 2"). The photosensitive drum 2 is an example of a rotating photoreceptor, and may be a photosensitive belt.

In addition, the image forming portions 1Y, 1M, 1C, and 1K include charging rollers 3Y, 3M, 3C, and 3K (hereinafter, also collectively and simply referred to as "charging rollers 3") as charging portions that respectively charge the photosensitive drums 2Y, 2M, 2C, and 2K.

In addition, the image forming portions 1Y, 1M, 1C, and 1K include light emitting diode (hereinafter referred to as LED) exposure heads 4Y, 4M, 4C, and 4K (hereinafter, also collectively and simply referred to as "exposure heads 4") as exposure portions that expose the photosensitive drums 2Y, 2M, 2C, and 2K.

Further, the image forming portions 1Y, 1M, 1C, and 1K include development units 24Y, 24M, 24C, and 24K (hereinafter, also collectively and simply referred to as "development units 24") as development portions that develop electrostatic latent images on the photosensitive drums 2 with toner and develop a toner image of each color on the photosensitive drums 2. Note that Y, M, C, and K attached to the reference numerals indicate the colors of the toner.

The image forming apparatus 100 illustrated in FIGS. 2 and 3 is an image forming apparatus that adopts a so-called "lower surface exposure system" that exposes the photosensitive drums 2 from below. In the image forming apparatus 100 adopting the lower surface exposure system, the exposure head 4 is disposed below the photosensitive drum 2. Hereinafter, a description will be given on the premise of an image forming apparatus adopting a lower surface exposure system. Note that, although not illustrated, an image forming apparatus adopting an "upper surface exposure system" that exposes the photosensitive drums from above may be used as an embodiment.

The image forming apparatus 100 includes an intermediate transfer belt 9 to which toner images formed on the photosensitive drums 2 are transferred, and primary transfer rollers 6 (Y, M, C, and K) that sequentially transfer the toner images formed on the photosensitive drums 2 on the intermediate transfer belt 9. The intermediate transfer belt 9 is disposed above the image forming portion 1. Note that, in addition to the intermediate transfer method using the intermediate transfer belt 9, a direct transfer method of directly transferring from the photosensitive drum 2 to a sheet may be used.

In addition, the image forming apparatus 100 includes a secondary transfer roller 16 that transfers the toner image on the intermediate transfer belt 9 to a recording sheet P conveyed from a feeding portion 11, and a fixing device 19 as a fixing portion that fixes the secondarily transferred image to the recording sheet P.

In addition, toner bottles 22Y, 22M, 22C, and 22K (hereinafter, also collectively and simply referred to as "toner bottles 22") that accommodate replenishment toners of the respective colors are detachably replaceable units with respect to the image forming apparatus 100. The toner bottles 22 are disposed above the intermediate transfer belt 9. In the toner bottles 22, an appropriate amount of toner is appropriately supplied from the corresponding toner bottle to each development unit included in the four image forming portions by a toner supply mechanism (not illustrated).

In addition, the image forming apparatus 100 includes the feeding portion 11 that feeds the recording sheet P. The feeding portion 11 includes sheet cassettes 12*a* and 12*b*, feeding rollers 13*a* and 13*b*, and a registration roller 15. The sheet cassettes 12*a* and 12*b* are disposed below the image forming portion 1. The recording sheets P accommodated in the sheet cassettes 12*a* and 12*b* are fed one by one by the feeding rollers 13*a* and 13*b*, and conveyed to a secondary transfer portion T2 at a predetermined timing by the registration roller 15.

In addition, the image forming apparatus 100 includes a duct unit 60 in a detachable manner. The duct unit 60 is disposed below the image forming portion 1 and above the feeding portion 11. The duct unit 60 is an exposure cooling unit that communicates with a lifting duct 69 to be described later and cools the exposure heads 4 by an airflow through the lifting duct 69.

(Image Forming Process)

Next, the image forming process of the image forming apparatus 100 will be briefly described. The charging roller 3Y charges the surface of the photosensitive drum 2Y The exposure head 4Y exposes the surface of the photosensitive drum 2Y charged by the charging roller 3Y. As a result, an electrostatic latent image is formed on the photosensitive drum 2Y Next, the development unit 24Y develops the electrostatic latent image formed on the photosensitive drum 2Y with yellow toner. The yellow toner image developed on the surface of the photosensitive drum 2Y is transferred onto the intermediate transfer belt 9 by a primary transfer roller 6Y. Magenta, cyan, and black toner images are also formed by a similar image forming process and transferred to be superimposed on the intermediate transfer belt 9.

The toner image of each color transferred onto the intermediate transfer belt 9 is conveyed to the secondary transfer portion T2 by the intermediate transfer belt 9. The toner images conveyed to the secondary transfer portion T2 are collectively transferred to the recording sheet P conveyed from the feeding portion 11 by the secondary transfer roller 16. The recording sheet P to which the toner image is transferred is conveyed to the fixing device 19. The fixing device 19 fixes the toner image on the recording sheet P by heat and pressure. The recording sheet P subjected to the fixing process by the fixing device 19 is discharged to a discharge tray 21 disposed above the toner bottle 22 by a discharge roller 20.

(Drum Unit and Development Unit)

A replaceable drum unit 23 and the development unit 24 in the image forming apparatus 100 of the present embodiment will be described by way of example.

Figure 4:
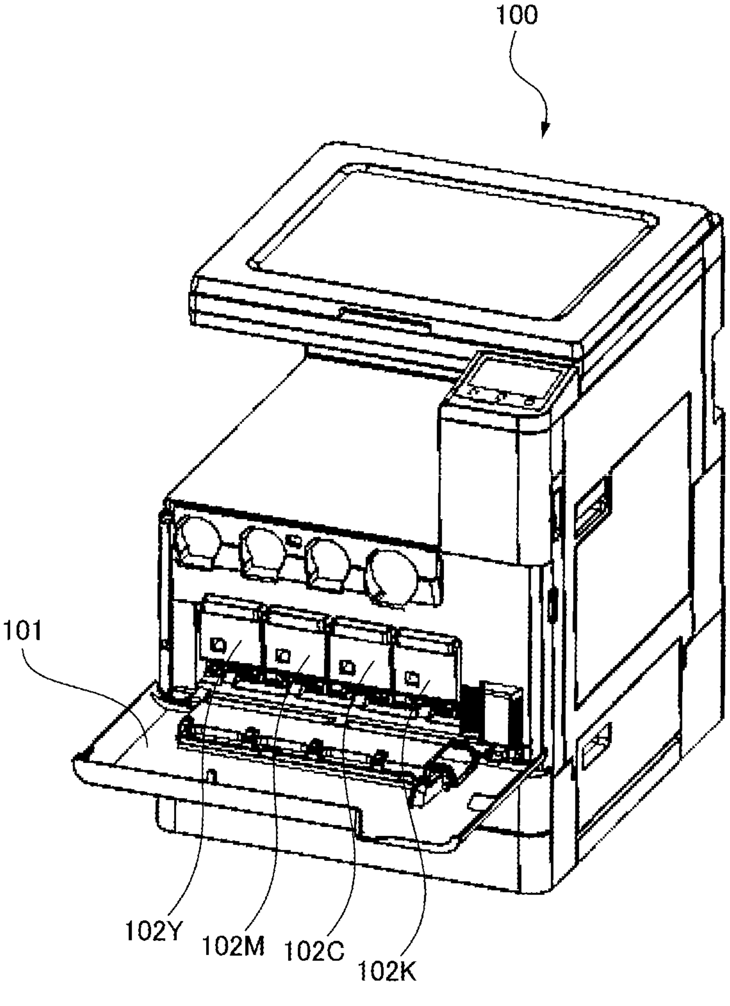
FIG. 4 is a perspective view of the image forming apparatus.
Figure 5:
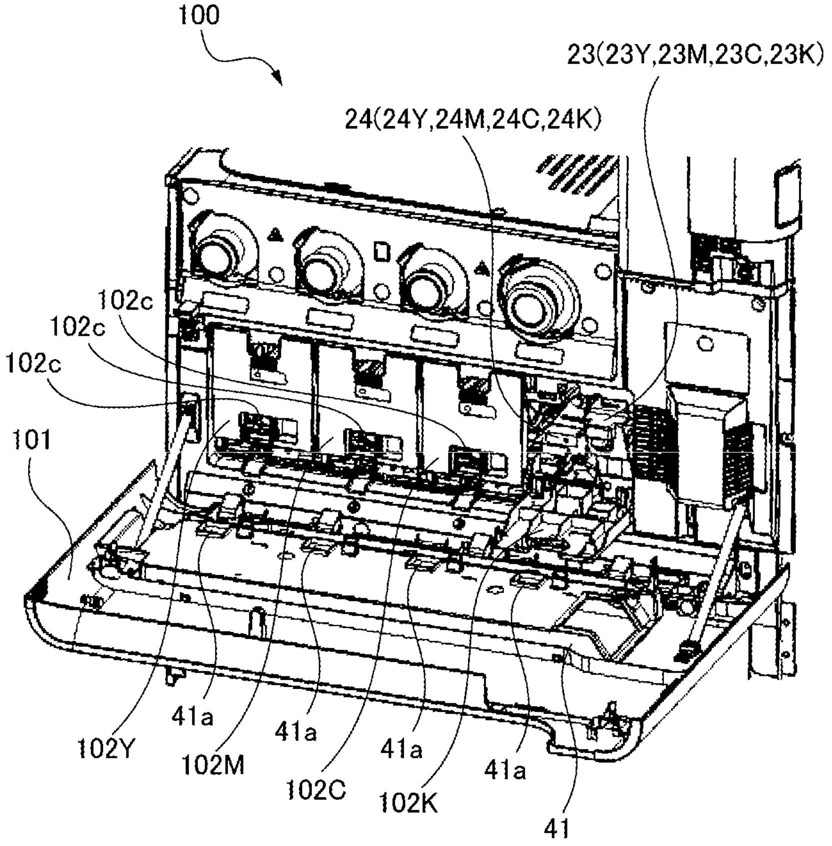
FIG. 5 is a partially enlarged perspective view of the image forming apparatus.
Figure 6:
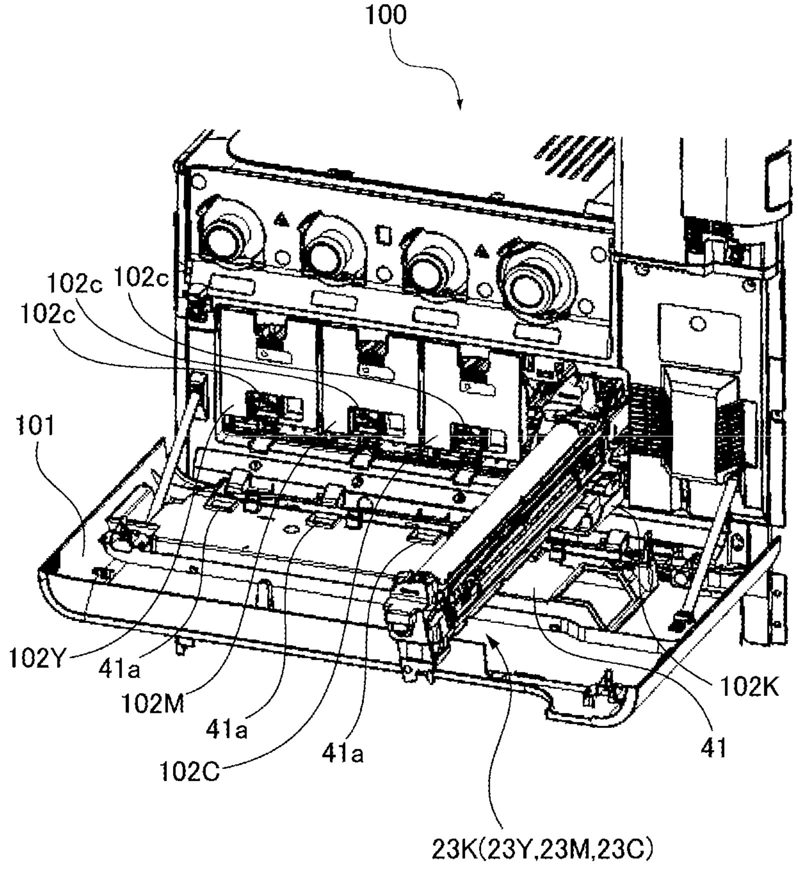
FIG. 6 is a partially enlarged perspective view of the image forming apparatus.
Figure 7:
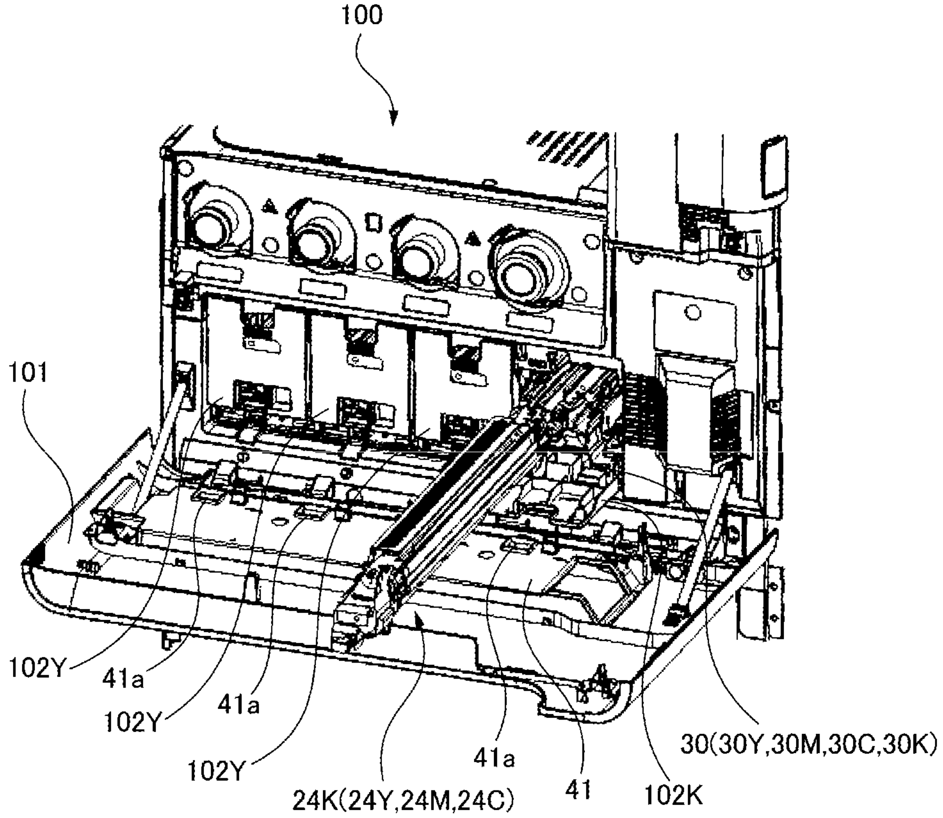
FIG. 7 is a partially enlarged perspective view of the image forming apparatus.

The photosensitive drums 2 and the charging rollers 3 described above are integrally unitized (drum unit and drum cartridge) together with a cleaning device (not illustrated). An example of the configuration will be described with reference to FIGS. 4, 5, 6, and 7. FIGS. 4 and 5 are perspective views illustrating schematic structures around the drum units 23 (Y, M, C, and K) and around the development units 24 (Y, M, C, and K) included in the image forming apparatus 100. In addition, FIG. 6 is a view illustrating a state in which the drum unit 23 is inserted into and removed from the image forming apparatus 100 from the outside of the apparatus body. FIG. 7 is a view illustrating a state in which the development unit 24 is inserted into and removed from the image forming apparatus 100 from the outside of the apparatus body.

The drum unit 23Y, 23M, 23C, and 23K (hereinafter, also collectively and simply referred to as "drum units 23") including the photosensitive drums 2 are attached to the image forming apparatus 100. The drum unit 23 is a cartridge to be replaced by an operator such as a user and a maintenance person. The drum unit 23 of the present embodiment rotatably supports the photosensitive drum 2. Specifically, the photosensitive drum 2 is rotatably supported by the frame body of the drum unit 23. Note that the drum unit 23 may not include the charging roller 3 or the cleaning device.

In addition, the development units 24Y, 24M, 24C, and 24K (hereinafter, also collectively and simply referred to as "development units 24") separate from the drum units 23, which are photoreceptors, are attached to the image forming apparatus 100. The development unit 24 includes development sleeves 5Y, 5M, 5C, and 5K (hereinafter, also collectively and simply referred to as "development sleeves 5") as developer carriers that carry the developer, and screws 7Y, 7M, 7C, and 7K (hereinafter, also collectively and simply referred to as "screws 7") that supply the developer to the development sleeves 5 and stirred the developer. The development unit 24 is a cartridge in which the development sleeve 5 and the screw 7 are integrated, and is detached from the apparatus body of the image forming apparatus 100 and replaced by an operator as illustrated in FIGS. 5 and 7.

Here, the toner is circulated and conveyed at high speed by the screw 7 inside the development unit 24. The rotation speed of the screw 7 is relatively very high with respect to the rotation speed of the development sleeve 5 and the photosensitive drum 2, and coating on the development sleeve 5 can be uniformly performed without unevenness.

Figure 8:
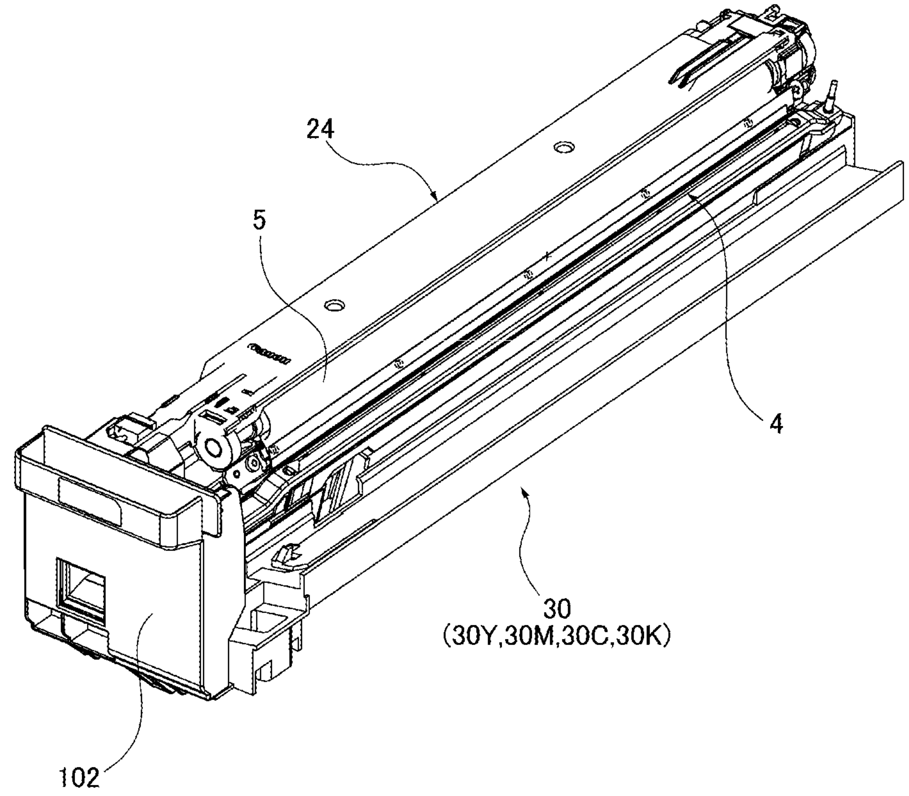
FIG. 8 is a perspective view of a cartridge tray.
Figure 9:
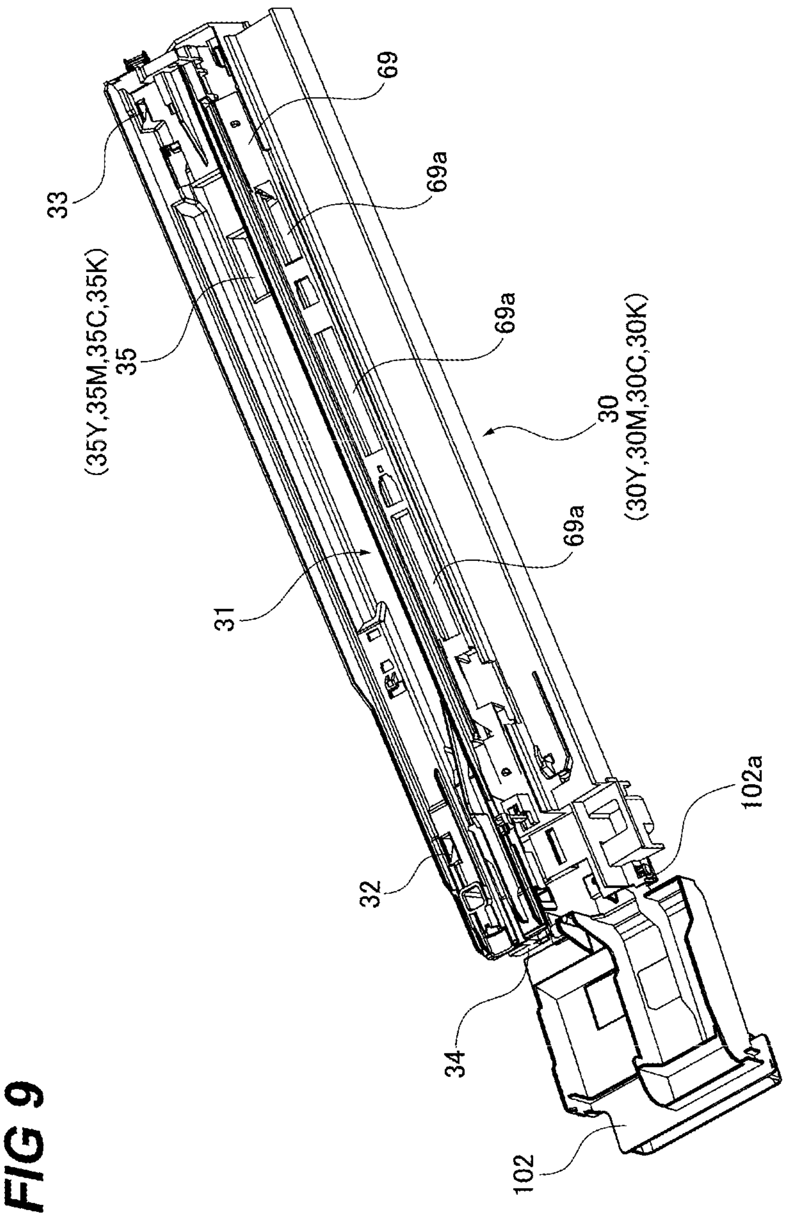
FIG. 9 is a perspective view of the cartridge tray.

In addition, the image forming apparatus 100 includes a cartridge tray 30 (30Y, 30M, 30C, and 30K) for each image forming portion (see FIGS. 8 and 9). The drum unit 23 and the development unit 24 are supported by the cartridge tray 30 of each image forming portion, guided in the axial direction of the photosensitive drum, and inserted into and removed from the apparatus body of the image forming apparatus 100.

Note that one of the cartridge trays 30 is attached to a front side plate 100F (see FIG. 18) and the other is attached to a back side plate 100B (see FIG. 18) in the axial direction of the photosensitive drum. The front side plate 100F is formed of sheet metal, and forms a part of a housing of the apparatus body on the near side of the apparatus body of the image forming apparatus 100. The back side plate 100B is formed of sheet metal, and forms a part of a housing of the apparatus body on the far side of the apparatus body of the image forming apparatus 100. The front side plate 100F and the back side plate 100B are disposed to face each other on one side and the other side in the axial direction of the photosensitive drum, and a beam (sheet metal not illustrated) is bridged between. Here, regarding the image forming apparatus of the present embodiment or the constituent members, the front surface side or the near side is a side on which the drum unit 23 and the development unit 24 are taken in and out (inserted and removed) with respect to the apparatus body of the image forming apparatus 100.

Since the drum unit 23 and the development unit 24 deteriorate due to repetition of the image forming process, they take the form of a unit (cartridge) that can be maintained by replacement or attachment and detachment.

FIG. 3 illustrates the arrangement of the drum units 23, the development units 24, and the exposure heads 4 when replacement or attachment and detachment is performed. In the image forming apparatus illustrated in FIG. 3, unlike the image forming apparatus illustrated in FIG. 2, it can be seen that the development unit 24 and the exposure head 4 are retracted and separated from the photosensitive drum 2.

This is because, when the state in which the development unit 24 and the exposure head 4 are disposed close to the photosensitive drum 2 as illustrated in FIG. 2 is maintained, each unit may be damaged due to dynamic interference at the time of attachment and detachment of the unit, or the unit may not be taken out.

Therefore, at the time of attaching and detaching the unit, the development unit 24 and the exposure head 4 are retracted from the photosensitive drum 2 and separated from each other as illustrated in FIG. 3 by a retraction mechanism by a development stay 31, a rotary arm 65, the lifting duct 69, and the like, which will be described later.

The drum unit 23 and the development unit 24 are inserted into and removed from the near side of the image forming apparatus 100, and are mounted at predetermined positions (mounting positions) of the apparatus body of the image forming apparatus 100.

The image forming apparatus 100 includes inner doors 102Y, 102M, 102C, and 102K (hereinafter, also collectively and simply referred to as "inner doors 102") that cover the near sides of both the drum unit 23 and the development unit 24 mounted at the mounting position. As illustrated in FIGS. 8 and 9, the inner door 102 has a rotary shaft 102*a* pivotally supported on the front side of the cartridge tray 30, and is rotatable within a predetermined range with respect to the cartridge tray 30. That is, the inner door 102 is provided to be openable and closable with respect to the image forming apparatus.

The inner door 102 is a cover that covers one end side in the axial direction of the drum unit 23 and the development unit 24 mounted on the image forming apparatus 100. Here, one end side in the axial direction is one end side in the axial direction of the photosensitive drum 2, and is a side (front surface side or near side) on which the drum unit 23 and the development unit 24 are taken in and out (inserted and removed) with respect to the apparatus body of the image forming apparatus 100.

The inner door 102 is a member necessary for protecting each unit and making it difficult for the photosensitive drum 2 to be exposed to light in a process other than the image forming process, and is disposed at a position facing the front surface in the attachment and detachment direction of each color unit.

Further, a front cover 101 forming an exterior of the apparatus is provided on the near side of the image forming apparatus 100. One end of the front cover 101 is fixed to the front side of the apparatus body of the image forming apparatus 100 by a hinge, and is rotatable with respect to the apparatus body of the image forming apparatus 100 by the hinge. The front cover 101 is provided on the front side of the inner door 102 in the axial direction of the photosensitive drum. In the closed state illustrated in FIG. 1, the front cover 101 covers the entire plurality of inner doors 102 arranged in the left-right direction to form an exterior on the front side of the apparatus.

Therefore, replacement work of the drum unit 23 and the development unit 24 is performed by an operator in the following procedure. The operator opens the front cover 101 as illustrated in FIG. 4, then opens the inner door 102 as illustrated in FIG. 5, and takes out the drum unit 23 (FIG. 6) or the development unit 24 (FIG. 7) in the apparatus body. Then, the replacement work is completed by inserting the new drum unit 23 or the development unit 24, closing the inner door 102, and further closing the front cover 101.

Note that the retraction mechanism of the development unit 24 and the exposure head 4 retracts the development unit 24 and the exposure head 4 from the photosensitive drum 2 in conjunction with the operation of opening the inner door 102. The retraction mechanism (development stay 31, rotary arm 65, and lifting duct 69) will be described later.

Here, in the following description, the front side plate side is defined as a front side (near side or front surface side), and the back side plate side is defined as a back side (far side or rear surface side) with respect to the apparatus body. In addition, when the photosensitive drum 2K on which the electrostatic latent image related to the black toner image is formed is used as a reference, a side on which the photosensitive drum 2Y on which the electrostatic latent image related to the yellow toner image is formed is disposed is defined as a left side. In addition, when the photosensitive drum 2Y on which the electrostatic latent image related to the yellow toner image is formed is used as a reference, a side on which the photosensitive drum 2K on which the electrostatic latent image related to the black toner image is formed is disposed is defined as a right side. Further, a direction perpendicular to the front-back direction and the left-right direction defined here and upward in the vertical direction is defined as an upward direction, and a direction perpendicular to the front-back direction and the left-right direction defined here and downward in the vertical direction is defined as a downward direction. The defined forward direction F, backward direction B, rightward direction R, leftward direction L, upward direction U, and downward direction D are illustrated in FIG. 1.

In addition, the axial direction of the photosensitive drum 2 described in the following description is a direction that coincides with the front-back direction (near-far direction) illustrated in FIG. 1. In addition, the longitudinal direction of the exposure head 4 also coincides with the front-back direction illustrated in FIG. 1. That is, the axial direction of the photosensitive drum 2 and the longitudinal direction of the exposure head 4 coincide with each other. In addition, one end side in the axial direction of the photosensitive drum 2 means a front side defined herein, and the other end side means a back side defined herein. One end side and the other end side in the front-back direction also correspond to the front side and the back side defined here. One end side in the left-right direction means a left side defined herein, and the other end side means a right side defined herein.

(Exposure Head)

Figure 10:
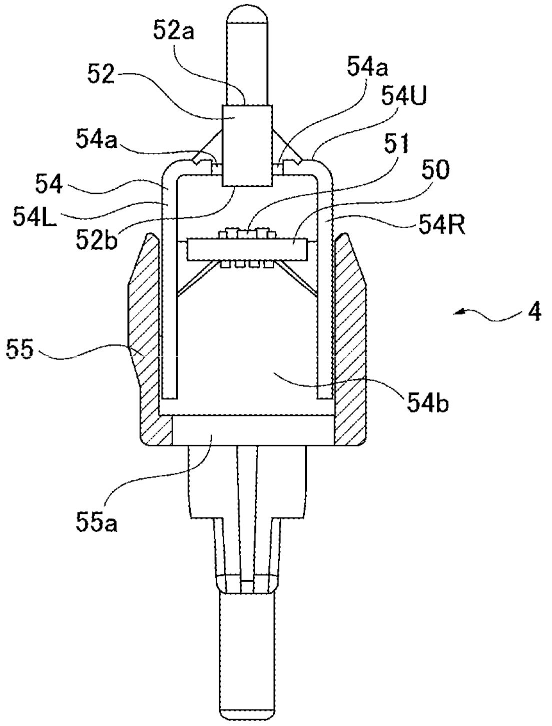
FIG. 10 is a cross-sectional view of an exposure head.
Figure 11:
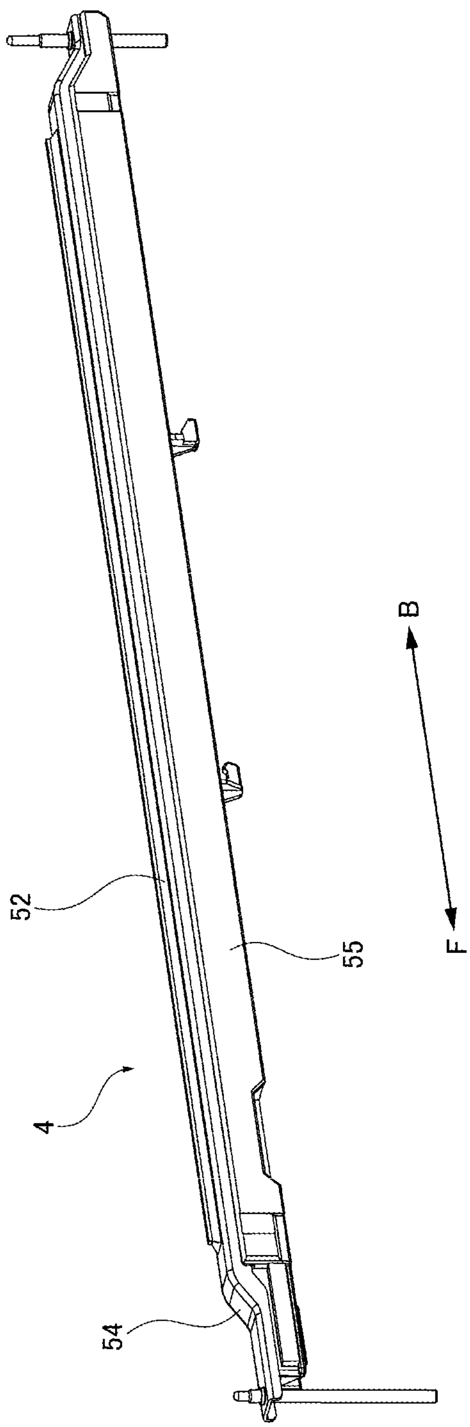
FIG. 11 is a perspective view of the exposure head.
Figure 12:
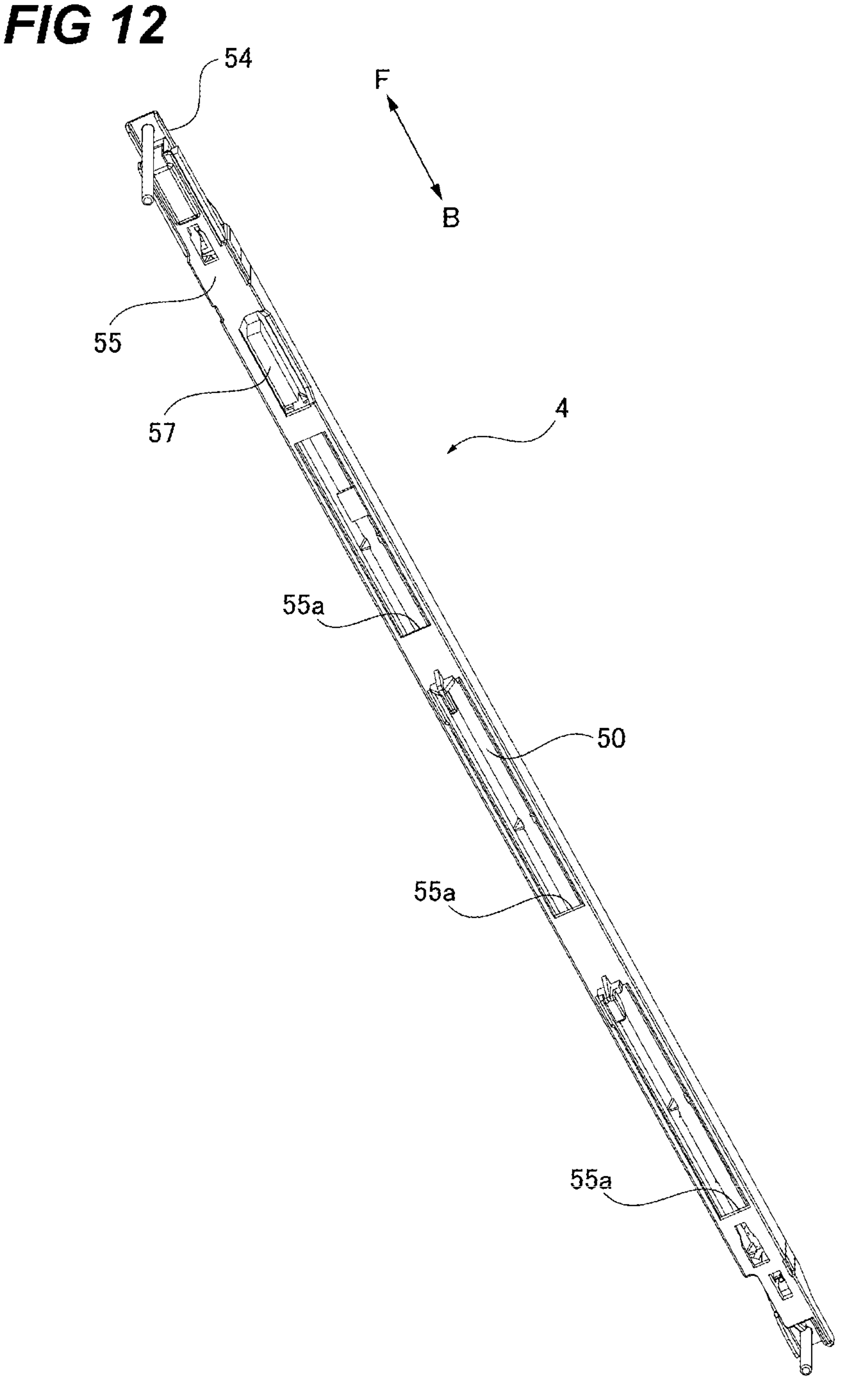
FIG. 12 is a perspective view of the exposure head.

Next, the exposure head 4 will be described with reference to FIGS. 10 to 12. FIG. 10 is a schematic cross-sectional view of the exposure head 4 included in the image forming apparatus of the present embodiment. FIG. 11 is a perspective view of the exposure head 4 as viewed from above. FIG. 12 is a perspective view of the exposure head 4 as viewed from below.

The exposure head 4 has an elongated shape (longitudinal shape) extending in the axial direction of the photosensitive drum 2. The exposure head 4 includes a substrate 50, a light emitting element mounted on the substrate 50, a lens array 52, and a holding member that holds the substrate 50 and the lens array 52. The holding member includes a housing 54 to be described later and a housing support member 55 that supports the housing 54.

Here, the exposure head 4 includes an LED 51 (light emitting diode) as a light emitting portion (light emitting element) that emits light. Note that, in the present embodiment, the light emitting element is a semiconductor LED which is a light emitting diode, but may be, for example, an organic light emitting diode (OLED). This OLED is also called organic electro-luminescence (EL), and is a current-driven light emitting element. The OLEDs are arranged on a line along the main scanning direction (axial direction of the photosensitive drum 2) on a thin film transistor (TFT) substrate, for example, and are electrically connected in parallel by power supply wiring similarly provided along the main scanning direction.

Note that, on one surface of the substrate 50, the plurality of LEDs 51 (light emitting portions) is arranged along the rotation axis direction of the photosensitive drum 2. On the other surface of the substrate 50, an FFC connector 57 to which one end of a flexible flat cable (hereinafter referred to as FFC) is connected is provided.

The lens array 52 condenses the light emitted from the light emitting element on the photosensitive drum 2. The lens array 52 is a lens assembly including a plurality of lenses. The plurality of lenses is arranged along the arrangement direction of the plurality of LEDs 51. Each lens is a cylindrical rod lens made of glass, and has a light incident surface **52*b* on which the light emitted from the LED 51 is incident and a light emitting surface 52*a* from which the light incident from the light incident surface is emitted (see FIG. 10**). Note that the material of the lens is not limited to glass, and may be plastic. The shape of the lens is not limited to the cylindrical shape, and may be, for example, a polygonal prism such as a hexagonal prism.

The exposure head 4 is moved in a direction substantially along the optical axis of the lens (hereinafter, also referred to as an optical axis direction) by the retraction mechanism (the rotary arm 65 and the lifting duct 69 illustrated in FIG. 13). The optical axis of the lens here means a line connecting the center of the light emitting surface of the lens and the focal point of the lens. The lens array 52 is a lens assembly including a plurality of lenses, and the "optical axis" described above is an optical axis of an arbitrary lens among the plurality of lenses. Here, strictly speaking, the plurality of lenses included in the lens array 52 may be slightly inclined to each other. This is due to tolerance during assembly. However, the deviation of the tolerance is not considered in a case where the direction of the optical axis is defined. Therefore, it is considered that the optical axes of the plurality of lenses are in the same direction. The lens array 52 has a function of condensing the light emitted from the LED 51 on the surface of the photosensitive drum 2.

The attachment position of the lens array 52 with respect to the housing 54 is adjusted at the time of assembling the exposure head 4 in a manner that a distance between the luminescent surface of the LED 51 and the light incident surface of the lens is substantially equal to a distance between the light emitting surface of the lens and the surface of the photosensitive drum 2.

The housing 54 holds the lens array 52 and the substrate 50. In the present embodiment, the housing 54 is a metal member formed by bending a plate material obtained by plating a galvanized steel plate or a cold-rolled steel plate. The housing 54 is made of metal as described above. For example, the housing 54 is formed by pressing a sheet metal such as an iron thin plate into a U shape.

The housing 54 has a flat surface portion (facing surface) 54U in which the first opening 54*a* into which the lens array 52 is inserted is formed. The flat surface portion 54U faces the photosensitive drum 2 in the optical axis direction of the lens of the lens array 52. Note that the flat surface portion 54U is not limited to a flat surface, and may be a slightly curved surface. In addition, the housing 54 has an extending portion 54R extending in a direction away from the photosensitive drum 2 from one side in the lateral direction of the flat surface portion 54U. In addition, the housing 54 has an extending portion 54L extending in a direction away from the photosensitive drum 2 from the other side in the lateral direction of the flat surface portion 54U.

The extending portion 54R and the extending portion 54L form a substrate support portion for supporting the substrate 50 inserted from a second opening 54*b* in the housing 54. The flat surface portion 54U and the substrate support portions (extending portions 54R and 54L) are integrated to form the housing 54 that holds the lens array 52 and the substrate 50, and the cross section is formed in a substantially U shape. Since the housing 54 is formed in a substantially U shape, the second opening 54*b* is formed on the side opposite to the flat surface portion 54U. The second opening 54*b* is formed between the substrate support portions (extending portions 54L and 54R) extending from the flat surface portion 54U to the side away from the photosensitive drum.

The substrate 50 is inserted from the second opening 54*b*, that is, from the lower side of the U-shaped housing 54, and is bonded to the inside of each substrate support portion (the inside of the extending portion 54L and the inside of the extending portion 54R) with an adhesive.

In addition, the lens array 52 is also bonded to the flat surface portion 54U with an adhesive in a state of being inserted into the first opening 54*a* formed in the flat surface portion 54U. Note that the lens array 52 is fixed to the flat surface portion 54U (housing 54) after the position and inclination in the focusing direction are adjusted by a jig in a manner that the distance in the focusing direction between all the LEDs 51 mounted on the substrate 50 and the lens array 52 becomes a predetermined value.

The housing support member 55 supports the housing 54 holding the substrate 50 and the lens array 52 in the longitudinal direction, and is provided integrally with the housing 54. The housing support member 55 is a member having a longitudinal shape extending in the axial direction of the photosensitive drum 2. The housing support member 55 is formed in a U shape as illustrated in FIG. 10. The housing support member 55 is provided with the plurality of openings 55*a* in the longitudinal direction which is the axial direction of the photosensitive drum 2.

The opening 55*a* of the housing support member 55 is provided at a position facing a surface (bottom surface of the substrate 50) of the substrate 50 opposite to the mounting surface (top surface of the substrate 50) on which the LED 51 is mounted.

Since the housing support member 55 is provided integrally with the housing 54, the airflow sent from the duct unit 60 is blown onto the bottom surface of the substrate 50 through the opening 55*a* of the housing support member 55. Moreover, the airflow blown onto the bottom surface of the substrate 50 is blown in a direction orthogonal to the bottom surface of the substrate 50.

As described above, the airflow blown from the opening 55*a* of the housing support member 55 to the bottom surface of the substrate 50 is separated from the development unit 24 and the drum unit 23 adjacent to the exposure head 4 by the housing support member 55. Therefore, the airflow for cooling the exposure head 4 introduced into the bottom surface of the substrate 50 does not leak to the side of the development unit 24 adjacent to the exposure head 4, and the toner of the development unit 24 can be suppressed from being scattered inside the image forming apparatus.

In addition, as described above, the housing support member 55 is provided over the longitudinal direction which is the axial direction of the photosensitive drum 2, and has the opening 55*a* at a position facing the bottom surface of the substrate 50. As a result, the housing support member 55 of the exposure head 4 forms a duct (closed space) that blows the airflow of the duct unit 60 onto the bottom surface of the substrate 50 through the opening 55*a* and circulates the airflow in the longitudinal direction of the substrate 50, that is, a part of the duct that cools the exposure head 4.

As described above, the exposure head 4 is configured as an integrated head unit by the substrate 50 including the LED 51, the lens array 52 including a plurality of lenses, the housing 54, and the housing support member 55.

(Lifting Duct)

The image forming apparatus 100 includes the lifting duct 69. The lifting duct 69 is an exposure support member that detachably supports the exposure head 4, and is provided in the apparatus body of the image forming apparatus 100 together with the cartridge tray 30 to be described later.

The lifting duct 69 is provided between a development support member 301 that supports the development unit 24 of the cartridge tray 30 to be described later and a drum support member 302 that supports the drum unit 23. The lifting duct 69 is provided to be movable between an exposure position (see FIG. 16) where the photosensitive drum 2 is exposed and a retraction position (FIG. 17) retracted from the exposure position between the development support member 301 and the drum support member 302 of the cartridge tray 30. Both end portions of the lifting duct 69 in the longitudinal direction are supported from below by the rotary arm 65. The lifting duct 69 is moved in a direction (moving direction) orthogonal to the axial direction of the photosensitive drum 2 integrally with the exposure head 4 by the rotary arm 65. The lifting duct 69 is moved to the exposure position or the retraction position by the rotation of the rotary arm 65.

The lifting duct 69 has a longitudinal shape extending in the front-back direction (the axial direction of the photosensitive drum) similarly to the exposure head 4 to be able to support the entire exposure head 4, and its central portion has a shape having upper and lower openings. The lifting duct 69 forms a duct in which one opening 69*a* (see FIG. 9) communicates with the opening 55*a* of the exposure head 4 and the other opening portion 64 (see FIG. 22) communicates with the opening portion 61 (see FIG. 19) of the duct unit 60. The lifting duct 69 supports the exposure head 4 and forms a part of a duct (closed space) that communicates the exposure head 4 and the duct unit 60 to form a flow path of an airflow for cooling the exposure head 4.

The lifting duct 69 is formed in a hollow shape having no opening at a position facing the development unit 24 and the drum unit 23 and having upper and lower openings (the opening 69*a* and the opening portion 64). The lifting duct 69 communicates the exposure head 4 and the duct unit 60 to form a space through which air for cooling the exposure head 4 circulates, and forms an exposure duct that guides an airflow generated by an intake fan 62 to be described later along the longitudinal direction of the substrate 50.

Accordingly, the lifting duct 69 allows the airflow from the duct unit 60 to be described later to circulate through the openings (the opening portion 64 and the opening 69*a*) to the bottom surface of the substrate 50 of the exposure head 4. Therefore, the lifting duct 69 can circulate the airflow caused by the duct unit 60 with respect to the bottom surface of the substrate 50 of the exposure head 4 without leaking the airflow to the side of the adjacent development unit 24 or drum unit 23, and the scattering of the toner inside the apparatus can be reduced.

Figure 13:
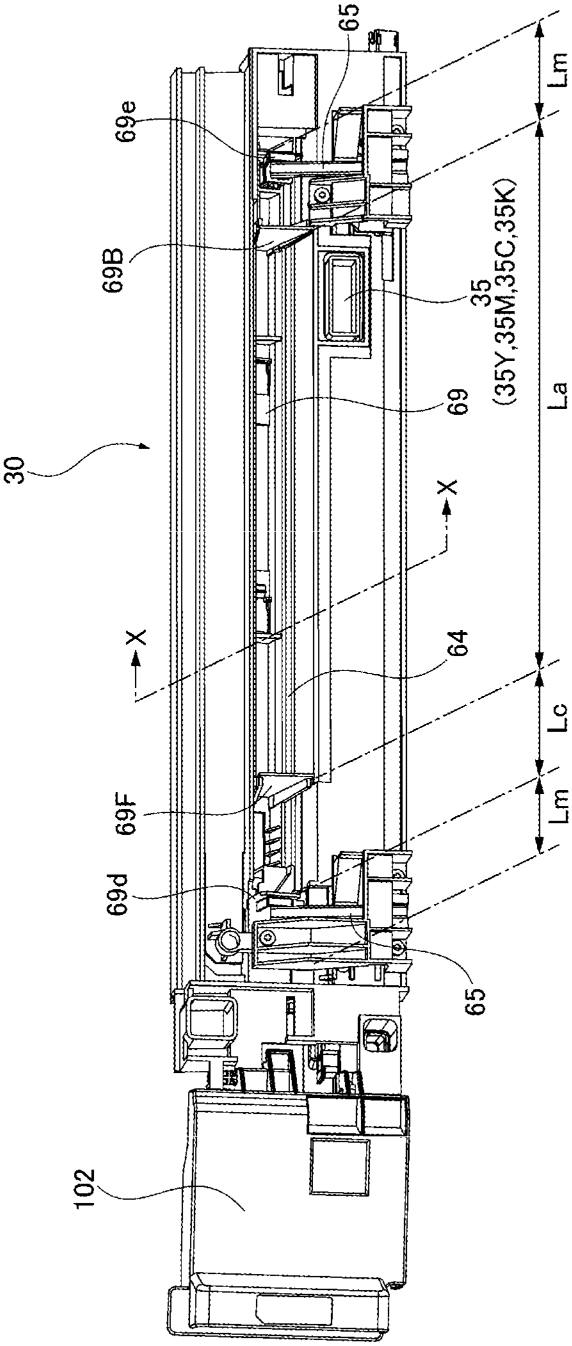
FIG. 13 is a perspective view of the cartridge tray.

Further, as illustrated in FIG. 13, the lifting duct 69 has a first engagement portion 69*d* and a second engagement portion 69*e* that are engaged with the rotary arm 65 at both end portions in the longitudinal direction. The first engagement portion 69*d* is provided outside the openings (the opening portion 64 and the opening 69*a*) of the lifting duct 69 on one end side in the longitudinal direction. The second engagement portion 69*e* is provided outside the openings (the opening portion 64 and the opening 69*a*) of the lifting duct 69 on the other end side in the longitudinal direction.

Therefore, a region (a range Lm in FIG. 13) where the first engagement portion 69*d* is provided and a region (the range Lm in FIG. 13) where the second engagement portion 69*e* is provided are provided outside a duct region (a range La in FIG. 13) where the openings (the opening portion 64 and the opening 69*a*) of the lifting duct 69 are surrounded by duct walls 69F and 69B. In other words, the duct region (the range La in FIG. 13) where the openings of the lifting duct 69 are surrounded by the duct walls 69F and 69B is provided between the region (the range Lm in FIG. 13) where the first engagement portion 69*d* is provided and the region (the range Lm in FIG. 13) where the second engagement portion 69*e* is provided.

Note that a range Lc in FIG. 13 is a region where the FFC connector 57 of the exposure head 4 is provided, and is provided outside a duct region indicated by the range La in FIG. 13 and between the duct region and a region where the first engagement portion 69*d* indicated by the range Lm in FIG. 13 is provided.

In addition, the range La forming the duct includes most of the substrate 50 on which the LED 51 is mounted, and the exposure head 4 can be sufficiently cooled by blowing the airflow to the range La. Note that the range Lc is a mounting portion of the FFC connector 57 of a signal line that transmits a drive signal to the substrate 50 on which the LEDs 51 are mounted. The range Lc is not provided with an opening for forming a duct, but is configured to enable necessary and sufficient cooling in the range La as described above.

As a result, the air taken in from the outside of the apparatus by the duct unit 60 to be described later is blown against the bottom surface of the substrate 50 from the opening 55*a* of the exposure head 4 through the lifting duct 69. In addition, the airflow blown from the opening 55*a* of the exposure head 4 to the bottom surface of the substrate 50 is exhausted to the outside of the apparatus by the duct unit 60 through the lifting duct 69.

(Cartridge Tray)

In addition, the image forming apparatus 100 includes the cartridge tray 30. The cartridge tray 30 will be described with reference to FIGS. 8, 9, and 13. FIGS. 8, 9, and 13 are perspective views of the cartridge tray 30.

The cartridge tray 30 is a support member that supports the drum unit 23 and the development unit 24 described above, and guides and supports the attaching and detaching operation along the axial direction of the photosensitive drum 2. The cartridge tray 30 pivotally supports the rotary shaft 102*a* of the inner door 102 in a manner that the inner door 102 is rotatable within a predetermined range.

The cartridge tray 30 is provided for each image forming portion. Each cartridge tray 30 includes the development support member 301 that guides and supports the attaching and detaching operation of the development unit 24 along the axial direction of the photosensitive drum 2, and the drum support member 302 that guides and supports the attaching and detaching operation of the drum unit 23 along the axial direction of the photosensitive drum 2. The development support member 301 and the drum support member 302 are members having a longitudinal shape extending in the axial direction of the photosensitive drum 2. In the cartridge tray 30, the development support member 301 and the drum support member 302 are integrally formed. Note that the cartridge tray 30 is not limited to the configuration provided for each image forming portion.

The lifting duct 69 is movably disposed between the development support member 301 and the drum support member 302 of the cartridge tray 30. In the lifting duct 69, the first engagement portion 69*d* and the second engagement portion 69*e* at both ends in the longitudinal direction are supported by the rotary arm 65 from below between the development support member 301 and the drum support member 302. The rotary arm 65 is rotatably provided on the development support member 301 of the cartridge tray 30. The exposure head 4 is detachably mounted to the lifting duct 69 movably disposed on the cartridge tray 30. In other words, the cartridge tray 30 is a support member that supports the exposure head 4, and guides and supports the attaching and detaching operation along the axial direction of the photosensitive drum 2.

(Development Stay)

Figure 14:
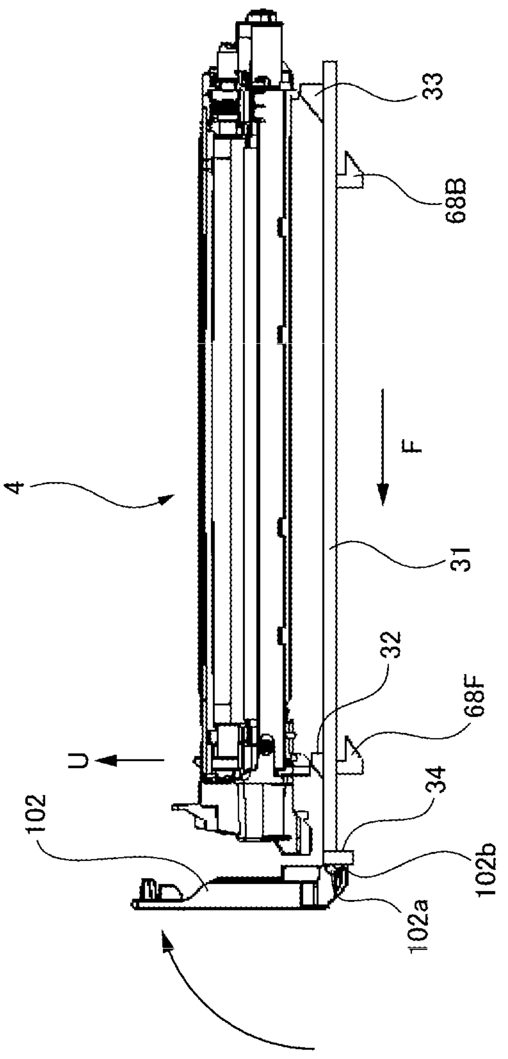
FIG. 14 is a side view of a development stay.
Figure 15:
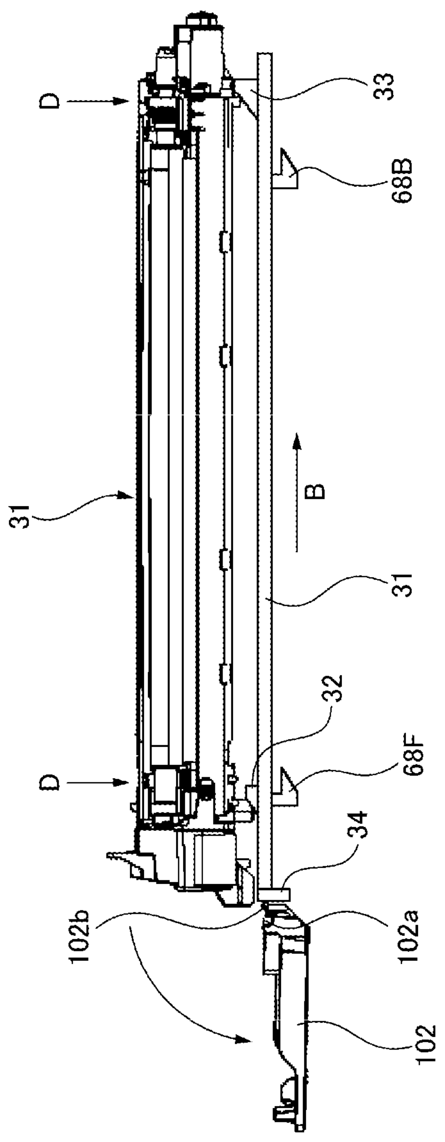
FIG. 15 is a side view of the development stay.
Figure 16:
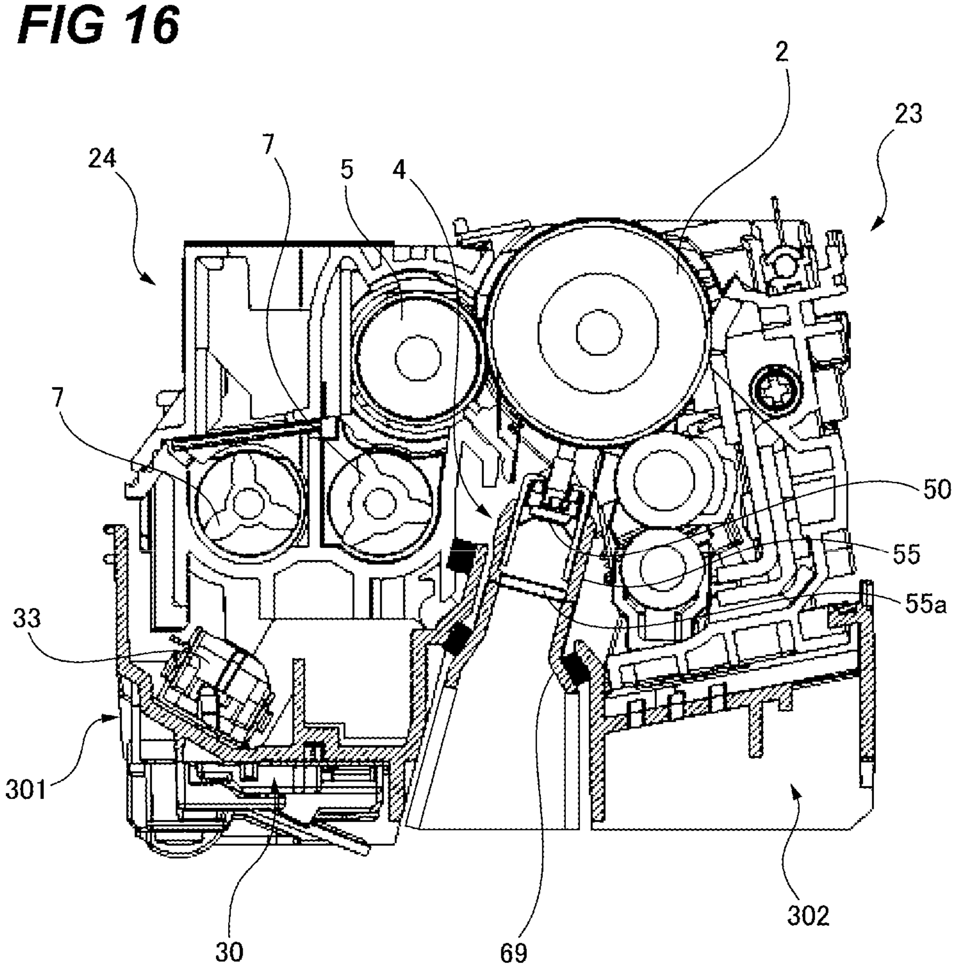
FIG. 16 is a cross-sectional view taken along a line X-X in FIG. 13.
Figure 17:
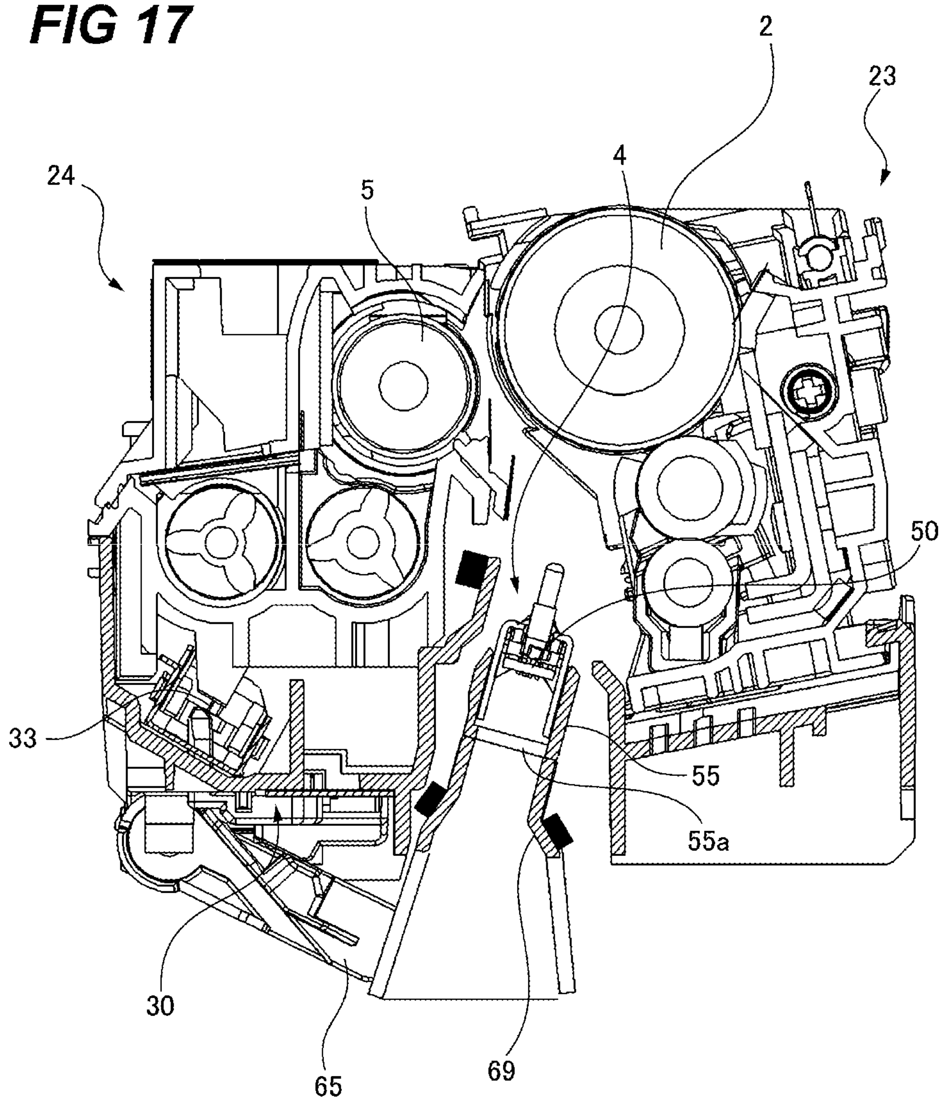
FIG. 17 is a cross-sectional view taken along the line X-X in FIG. 13.

The image forming apparatus 100 includes the development stay 31 slidable along the axial direction of the photosensitive drum 2. The development stay 31 will be described with reference to FIGS. 14 and 15. FIGS. 14 and 15 are side views of the development stay 31 as viewed from the right direction. In FIG. 14, the inner door 102 is in a closed state, and the development unit 24 is at a position close to the photosensitive drum 2. In FIG. 15, the inner door 102 is in an open state, and the development unit 24 is at a position retracted from the photosensitive drum 2. FIG. 16 is a cross-sectional view taken along a line X-X in FIG. 13, and is a view illustrating a state in which the exposure head 4 is at an exposure position close to the photosensitive drum 2. FIG. 17 is a cross-sectional view taken along the line X-X in FIG. 13, and is a view illustrating a state in which the exposure head 4 is at a retraction position retracted from the exposure position.

The development stay 31 as a slide member is provided to be movable in the axial direction of the photosensitive drum 2. The development stay 31 moves in one direction in the axial direction in conjunction with the opening operation of the inner door 102, and moves in the other direction in the axial direction in conjunction with the closing operation of the inner door 102. The development stay 31 is provided movably with respect to the development support member 301 of the cartridge tray 30. The development stay 31 has an elongated shape (longitudinal shape) extending in the axial direction of the photosensitive drum 2, and includes a development pressurizing top 32, a development pressurizing top 33, a development stay link 34, an arm retraction member 68F, and an arm retraction member 68B.

The development stay link 34 is fixed to the front side end portion of the development stay 31 and is engaged with the inner door 102 pivotally supported by the cartridge tray 30. The development pressurizing top 32 is fixed to one side (front side) in the longitudinal direction of the development stay 31, and the development pressurizing top 33 is fixed to the other side (back side) in the longitudinal direction of the development stay 31. The development pressurizing top 32 and the development pressurizing top 33 are provided at positions facing the development unit 24.

The development pressurizing tops 32 and 33 are development engagement members that are moved in the same direction by the movement of the development stay 31 and are engaged with the development unit 24. The development pressurizing tops 32 and 33 are engaged with the development unit 24 to move the development unit 24 to a development position close to the photosensitive drum 2 (see FIG. 16) or a separated position separated from the photosensitive drum 2 (see FIG. 17).

The inner door 102 includes a link engagement portion 102*b* that is engaged with the development stay link 34. In the inner door 102, the link engagement portion 102*b* is provided on the side opposite to the portion covering the unit via the rotary shaft 102*a*.

As illustrated in FIG. 15, in a state where the inner door 102 is opened, the link engagement portion 102*b* engaged with the development stay link 34 is positioned closer to the rear end of the inner door 102 than the rotary shaft 102*a*. On the other hand, as illustrated in FIG. 14, in a state where the inner door 102 is closed, the link engagement portion 102*b* is positioned closer to the lower end of the inner door 102 than the rotary shaft 102*a*. Therefore, according to the rotation of the inner door 102, the link engagement portion 102*b* of the inner door 102 moves in the rotation direction along a locus of a circle having a radius that is the distance between the rotary shaft 102*a* and the link engagement portion 102*b*. That is, as illustrated in FIG. 15, by opening the inner door 102, the link engagement portion 102*b* also rotates and moves to the apparatus back side.

As a result, the development stay link 34 engaged with the link engagement portion 102*b* of the inner door 102 is slid in the direction of an arrow B which is the apparatus back side, and the two development pressurizing tops 32 and 33 integrally configured through the development stay 31 are also slid in the direction of the arrow B. This means that, as illustrated in FIG. 15, the two development pressurizing tops 32 and 33 are out of the holding position where the development unit 24 is held. When the development pressurizing tops 32 and 33 deviate from the holding position, the development unit 24 moves in a direction of an arrow D, which is a direction in which the development pressurizing tops 32 and 33 are retracted from the photosensitive drum 2 by their own weight.

From the above description, it can be seen that the development unit 24 retracts from the photosensitive drum 2 in conjunction with the operation of opening the inner door 102. Note that, when the inner door 102 is closed, the development unit 24 is moved in the direction of the photosensitive drum 2 and pressed through a procedure reverse to the opening operation.

In this manner, as illustrated in FIG. 14, the development stay 31 is slid and moved in the forward direction F in conjunction with the operation of closing the inner door 102. At this time, the development pressurizing top 32 and the development pressurizing top 33 are engaged with the development unit 24, and the development unit 24 is moved upward (arrow U) along the inclined surfaces of the development pressurizing top 32 and the development pressurizing top 33 of the development stay 31. As a result, the development sleeve 5 of the development unit 24 is moved in a direction approaching the photosensitive drum 2 of the drum unit 23, and the development sleeve 5 is moved to a development position (see FIG. 16) approaching the photosensitive drum 2.

In addition, as illustrated in FIG. 15, the development stay 31 is slid in the backward direction B in conjunction with the operation of opening the inner door 102. At this time, the development pressurizing top 32 and the development pressurizing top 33 are engaged with the development unit 24, and the development unit 24 is moved downward (arrow D) along the inclined surfaces of the development pressurizing top 32 and the development pressurizing top 33 of the development stay 31. As a result, the development sleeve 5 of the development unit 24 is moved in a direction away from the photosensitive drum 2 of the drum unit 23, and the development sleeve 5 is moved to a separated position (see FIG. 17) separated from the photosensitive drum 2. At the time of non-development illustrated in FIG. 15, the development sleeve 5 is separated from the photosensitive drum 2 as compared with the time of development illustrated in FIG. 14.

Further, the development stay 31 includes the arm retraction member 68F and the arm retraction member 68B for rotating the rotary arm 65 which is a rotary member. The arm retraction member 68F and the arm retraction member 68B are integrally formed with the development stay 31. The arm retraction member 68F is fixed to one side (apparatus front side) in the longitudinal direction of the development stay 31, and is provided on a surface on the opposite side of the development pressurizing top 32. The arm retraction member 68B is fixed to the other side (apparatus back side) in the longitudinal direction of the development stay 31, and is provided on a surface on the opposite side of the development pressurizing top 33. The arm retraction members 68F and 68B as the engagement members are moved in the same direction by the development stay 31 being slid in the front-back direction in conjunction with the opening and closing operation of the inner door 102, and are engaged with or disengaged from the rotary arm 65 to rotate the rotary arm 65.

That is, when the development stay 31 moves in one direction in the axial direction (backward direction B illustrated in FIG. 15) in conjunction with the opening operation of the inner door 102, the arm retraction member 68F and the arm retraction member 68B are moved in the same direction and are engaged with the rotary arm 65. As a result, the rotary arm 65 rotates in one direction to move the exposure head 4 to the retraction position integrally with the lifting duct 69. On the other hand, when the development stay 31 moves in the other direction in the axial direction (forward direction F illustrated in FIG. 14) in conjunction with the closing operation of the inner door 102, the arm retraction member 68F and the arm retraction member 68B are moved in the same direction and are disengaged with the rotary arm 65. As a result, the rotary arm 65 rotates in the other direction to move the exposure head 4 to the exposure position integrally with the lifting duct 69.

(Rotary Arm)

Note that the rotary arm 65 is a rotary member that moves the exposure head 4 between the exposure position (see FIG. 16) close to the photosensitive drum 2 and the retraction position (see FIG. 17) retracted from the exposure position.

The rotary arm 65, which is a rotary member, is rotatably provided on the development support member 301 of the cartridge tray 30. One end portion of the rotary arm 65 in the left-right direction orthogonal to the axial direction of the photosensitive drum 2 is rotatably supported about an axis parallel to the axial direction. In addition, the rotary arm 65 supports engagement portions 69*d* and 69*e* having other end portions in the left-right direction that are both end portions of a region (the range Lm in FIG. 13) outside the openings (the opening 69*a* and the opening portion 64) of the lifting duct 69 in the axial direction.

The rotary arm 65 presses the base surfaces of the first engagement portion 69*d* and the second engagement portion 69*e* at both ends in the longitudinal direction of the lifting duct 69 upward by the force of an arm pressure spring (not illustrated) which is a biasing member. In FIG. 16, the exposure head 4 is disposed close to the photosensitive drum 2, and this is maintained by the rotary arm 65 pressing the base surfaces of the first engagement portion 69*d* and the second engagement portion 69*e* at both ends of the lifting duct 69 upward. This pressing is secured by a predetermined spring pressure by the arm pressure spring.

In this manner, the rotary arm 65 does not directly press the exposure head 4 but presses the lifting duct 69 that supports the exposure head 4.

The rotary arm 65 rotates about a rotary shaft in response to the slide movement of the development stay 31, and moves the exposure head 4 to the exposure position (see FIG. 16) or the retraction position (see FIG. 17). That is, in conjunction with the operation of opening and closing the inner door 102, the rotary arm 65 rotates in one direction to move the exposure head 4 to the exposure position where the photosensitive drum 2 is exposed, and rotates in the other direction to move the exposure head 4 to the retraction position retracted from the exposure position.

The rotary arm 65 constituting a moving mechanism for moving the exposure head 4 to the exposure position and the retraction position is provided outside a duct region (the range La illustrated in FIG. 13) of the exposure head. Therefore, air does not become an obstacle when air is sent from the lower side of the exposure head 4 to the duct region, and air can be directly blown onto the bottom surface of the substrate 50 of the exposure head 4. As a result, the substrate 50 including the light emitting element of the exposure head 4 can be more effectively cooled.

Note that the operation of the rotary arm 65 that moves the exposure head 4 to the exposure position or the retraction position is powered by the slide movement of the development stay 31 that retracts the development unit 24, but may be powered via another member linked with the inner door 102.

(Duct Unit)

Figure 18:
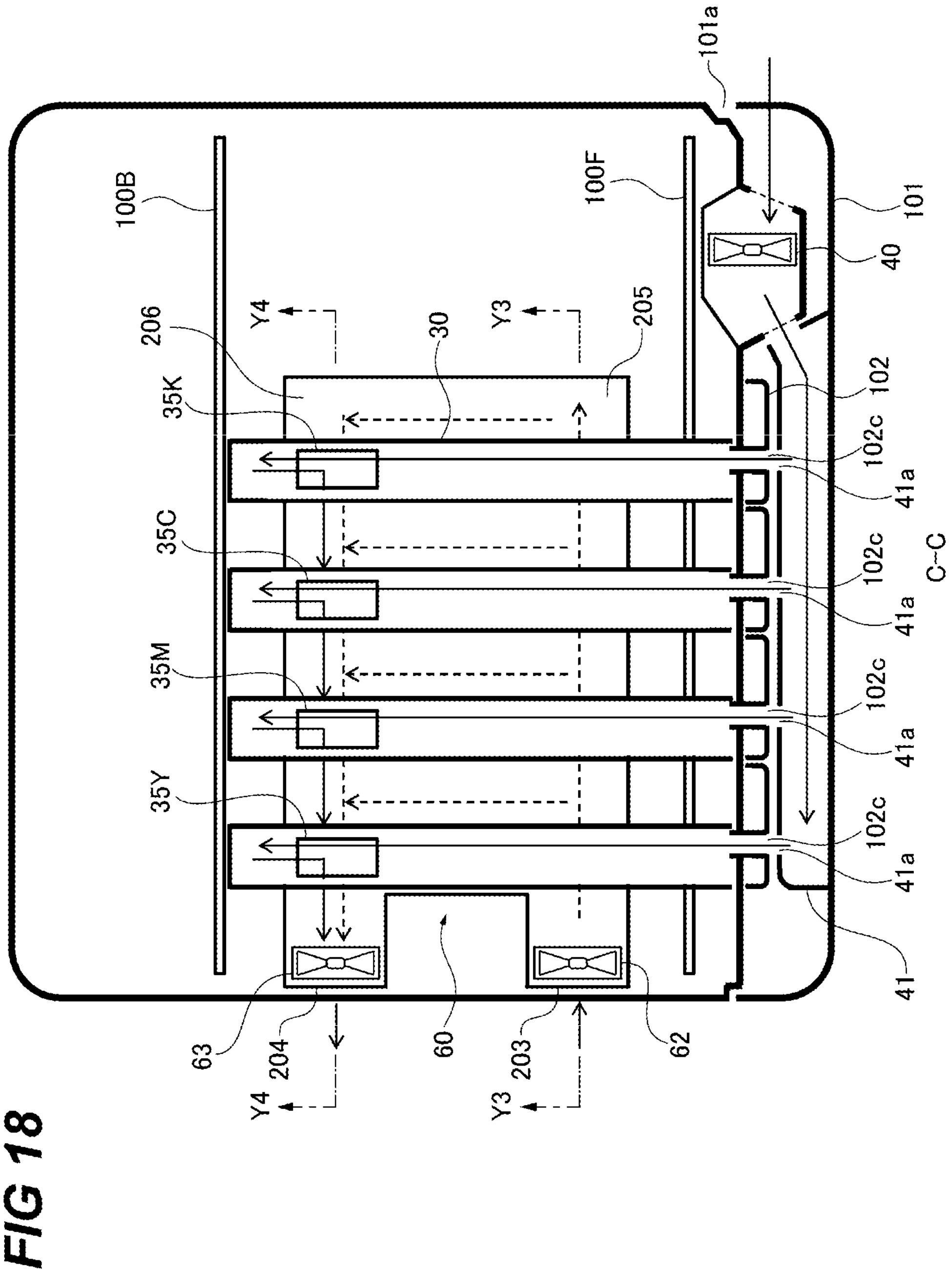
FIG. 18 is a cross-sectional view taken along a line C-C in FIG. 2.
Figure 19:
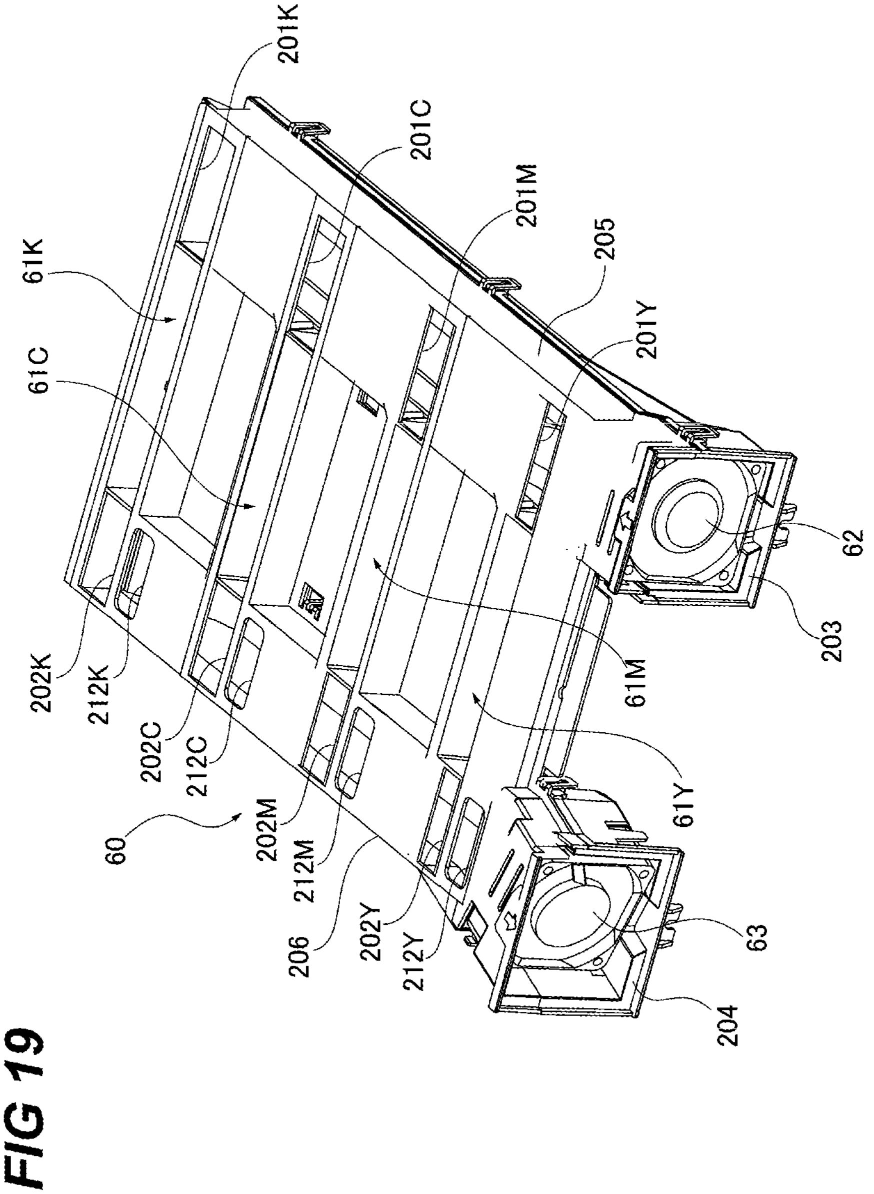
FIG. 19 is a perspective view of a duct unit.

In addition, the image forming apparatus 100 includes the duct unit 60 in a detachable manner. The duct unit 60 will be described with reference to FIGS. 18 and 19. FIG. 18 is a cross-sectional view of the image forming apparatus taken along the line C-C in FIG. 2. FIG. 19 is a perspective view of the duct unit as viewed from above.

The duct unit 60 is an exposure cooling unit that communicates with the opening portion 64 formed by the cartridge tray 30 and the lifting duct 69 and cools the exposure heads 4 by an airflow through the lifting duct 69.

Note that, as described above, the lifting duct 69 is formed in a hollow shape having upper and lower openings (the opening 69*a* and the opening portion 64). The lifting duct 69 forms a duct (exposure duct) in which one opening 69*a* communicates with the opening 55*a* of the exposure head 4 and the other opening portion 64 communicates with the opening portion 61 of the duct unit 60. The lifting duct 69 communicates the exposure head 4 and the duct unit 60 to form an exposure duct that forms a space through which air for cooling the exposure head 4 circulates.

The duct unit 60 includes an exhaust duct 206 as a first duct that communicates with the lifting duct 69 and forms a space through which the air introduced from the lifting duct 69 circulates. The exhaust duct 206 communicates with the lifting duct 69 and a development duct to be described later, and exhausts the air introduced from the lifting duct 69 and exhausts the air introduced from the development duct. The exhaust duct 206 includes an exposure exhaust port 202 (Y, M, C, and K) as a first exposure introduction port that communicates with the lifting duct 69 and introduces air from the lifting duct 69 for each exposure head. The exposure exhaust port 202 is provided on the upper surface of the exhaust duct 206 disposed closer to the back side of the image forming apparatus 100.

The duct unit 60 has an exhaust port 204 that exhausts air from the exhaust duct 206 to the outside of the image forming apparatus. The exhaust port 204 is provided at the end portion of the exhaust duct 206 to face an exterior cover forming an outer surface (here, a left side surface) of the image forming apparatus.

The duct unit 60 includes an exhaust fan 63 that circulates air inside the exhaust duct 206 to generate an airflow to be exhausted from the exhaust port 204. The exhaust fan 63 is disposed at the exhaust port 204 of the exhaust duct 206.

The exhaust port 204 and the exposure exhaust port 202 (Y, M, C, and K) for each exposure head are connected by the exhaust duct 206. The duct unit 60 is configured to exhaust air introduced from each exposure exhaust port 202 by the exhaust fan 63 to the outside of the image forming apparatus from the exhaust port 204 through the exhaust duct 206.

The duct unit 60 includes an intake duct 205 as a second duct that communicates with the lifting duct 69 to form a space through which the air introduced into the lifting duct 69 circulates and guides the airflow generated by the intake fan 62 to the lifting duct 69. The duct unit 60 includes an exposure intake port 201 (Y, M, C, and K) as a second exposure introduction port that communicates with the lifting duct 69 and introduces air to the lifting duct 69 for each exposure head. The exposure intake port 201 is provided on the upper surface of the intake duct 205 disposed closer to the front side of the image forming apparatus 100.

The duct unit 60 has an intake port 203 that takes in air to the intake duct 205 from the outside of the image forming apparatus. The intake port 203 is provided at the end portion of the intake duct 205 to face an exterior cover forming an outer surface (here, a left side surface) of the image forming apparatus.

The duct unit 60 includes the intake fan 62 that generates an airflow that takes in air from the intake port 203 and circulates the air inside the intake duct 205. The intake fan 62 is a first fan that generates an airflow for cooling the exposure head. The intake fan 62 is disposed at the intake port 203 of the intake duct 205.

The intake port 203 and the exposure intake port 201 (Y, M, C, and K) for each exposure head are connected by the intake duct 205. The duct unit 60 is configured to take in air (fresh air) outside the image forming apparatus introduced from the intake port 203 by the intake fan 62 from each exposure intake port 201 through the intake duct 205.

The exhaust duct 206 of the duct unit 60 is provided on one side (far side) from the center in the axial direction of the photosensitive drum 2. The intake duct 205 of the duct unit 60 is provided on the other side (near side) from the center in the axial direction of the photosensitive drum 2.

The duct unit 60 is integrally provided with the intake fan 62, the exhaust fan 63, the intake duct 205, and the exhaust duct 206, and is detachably mounted to the apparatus body of the image forming apparatus 100 immediately below the cartridge tray 30.

In addition, the duct unit 60 includes the intake port 203 and the exhaust port 204 on the same surface (left surface) side of the image forming apparatus 100, and the intake fan 62 is disposed in the intake port 203 and the exhaust fan 63 is disposed in the exhaust port 204. In the present embodiment, as illustrated in FIG. 18, the intake fan 62 disposed closer to the front side of the image forming apparatus 100 functions as an intake fan that takes in air outside the apparatus, and the exhaust fan 63 disposed closer to the back side functions as an exhaust fan that exhausts air to the outside of the apparatus.

In the exterior cover forming the exterior of the left side surface of the image forming apparatus, a louver (not illustrated) as openings (a first opening and a second opening) are formed at positions facing each of the fans 62 and 63. The louver formed in the exterior cover communicates with the intake port 203 and the exhaust port 204 in which the fans 62 and 63 are disposed, respectively. Intake by the intake fan 62 and exhaust by the exhaust fan 63 are performed through a louver formed in the exterior cover forming the exterior of the left side surface of the image forming apparatus.

Note that, as illustrated in FIG. 19, the duct unit 60 has an opening portion 61 (Y, M, C, and K) in its upper surface for each exposure head. The opening portion 61 of the duct unit 60 includes the exposure intake port 201 provided closer to the apparatus front side and the exposure exhaust port 202 provided closer to the apparatus back side. The opening portion 61 (Y, M, C, and K) of the duct unit 60 is provided to correspond to each of the exposure heads 4 of the respective colors.

That is, the opening portion 60Y of the duct unit 60 includes the exposure intake port 201Y provided closer to the apparatus front side and the exposure exhaust port 202Y provided closer to the apparatus back side. The opening portion 60M of the duct unit 60 includes the exposure intake port 201M provided closer to the apparatus front side and the exposure exhaust port 202M provided closer to the apparatus back side. The opening portion 60C of the duct unit 60 includes the exposure intake port 201C provided closer to the apparatus front side and the exposure exhaust port 202C provided closer to the apparatus back side. The opening portion 60K of the duct unit 60 includes the exposure intake port 201K provided closer to the apparatus front side and the exposure exhaust port 202K provided closer to the apparatus back side.

The opening portion 61 of the duct unit 60 is provided at a position facing the opening portion 64 of the lifting duct 69 for each exposure head, and is connected to the opening portion 64 to communicate with the exposure head 4 to form a closed space.

(Cooling Configuration of Development Unit and Exposure Head)

Figure 20:
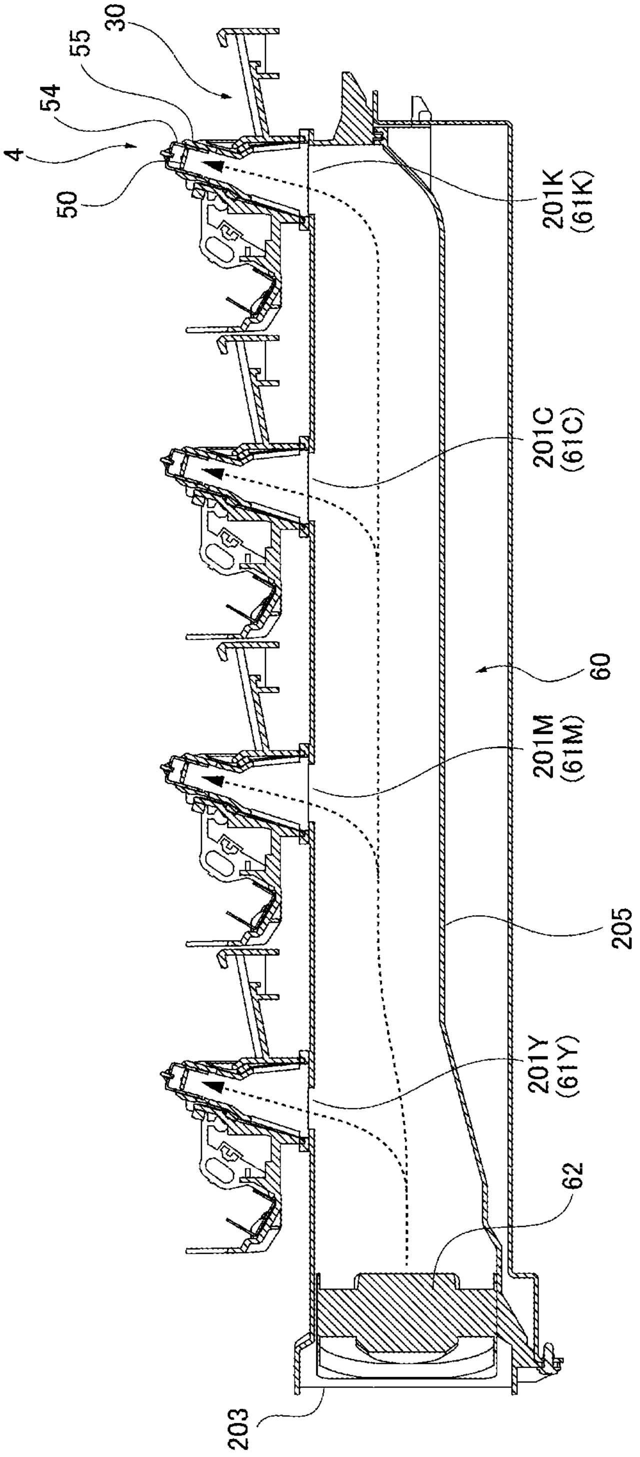
FIG. 20 is a cross-sectional view of an intake side of an exposure cooling airflow.
Figure 21:
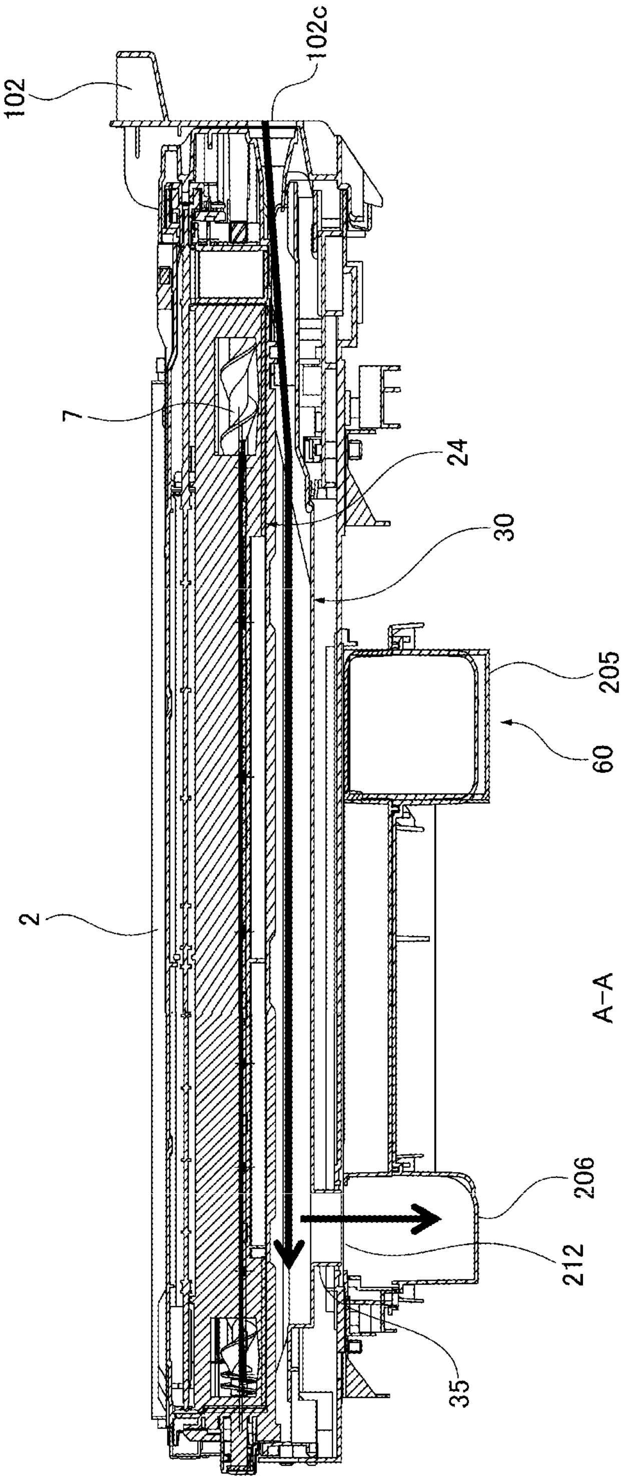
FIG. 21 is a cross-sectional view taken along a line A-A in FIG. 2.
Figure 22:
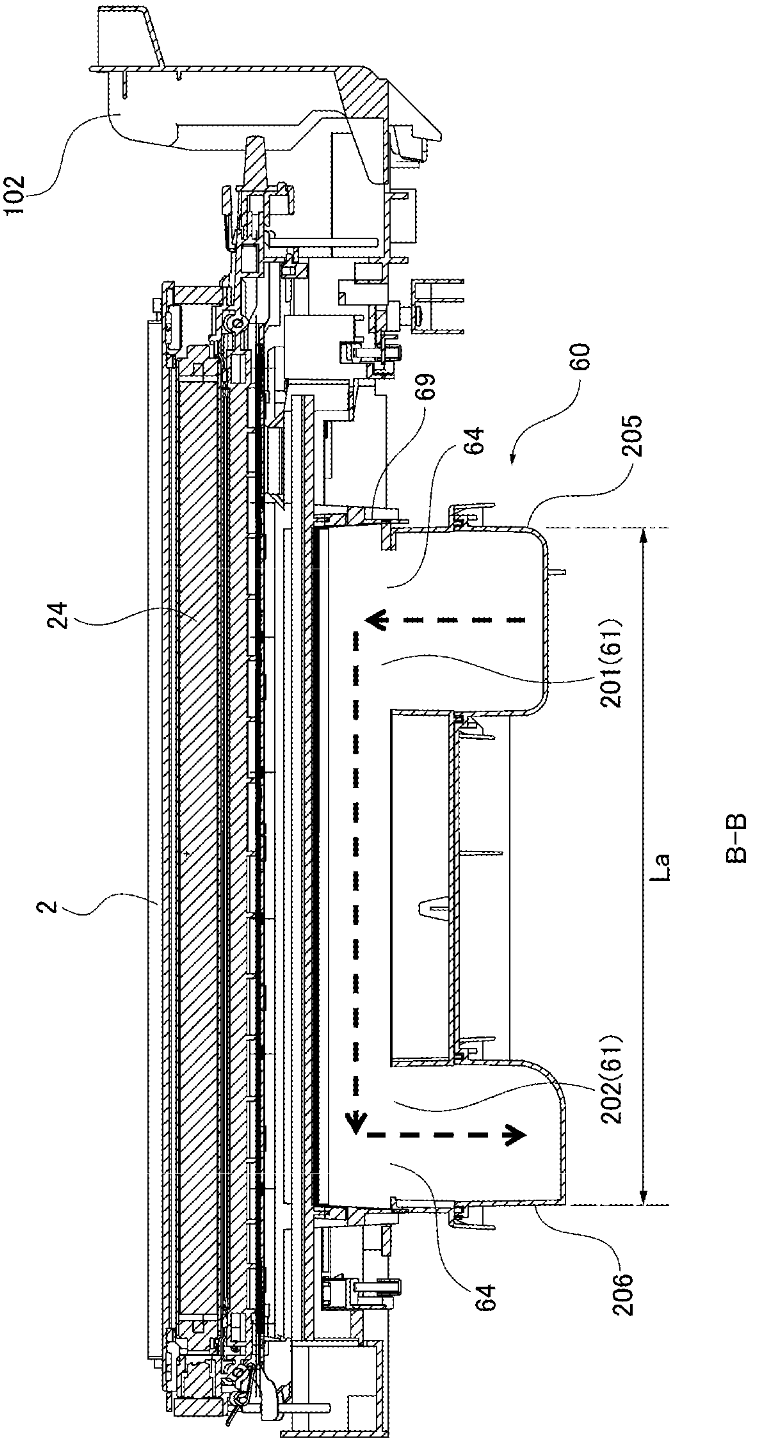
FIG. 22 is a cross-sectional view taken along a line B-B in FIG. 2.
Figure 23:
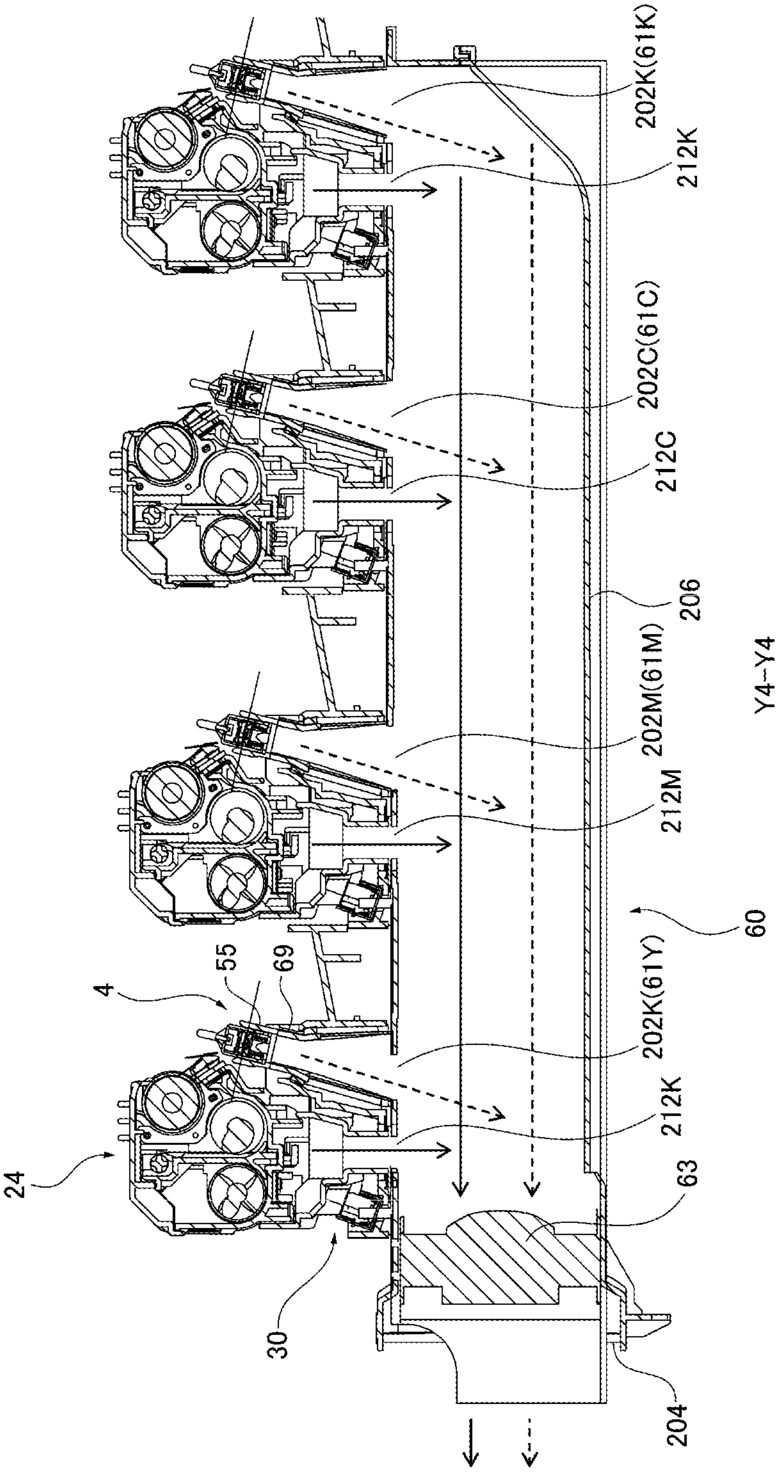
FIG. 23 is a cross-sectional view of an exhaust side of the development cooling airflow and the exposure cooling airflow.

Next, a cooling configuration of the development unit 24 and the exposure head 4 will be described with reference to FIGS. 18, 19, 20, 21, 22, and 23. FIG. 20 is a cross-sectional view of an intake side of an exposure cooling airflow. FIG. 21 is a cross-sectional view of the development cooling airflow taken along a line A-A in FIG. 2. FIG. 22 is a cross-sectional view of the exposure cooling airflow along a line B-B in FIG. 2. FIG. 23 is a cross-sectional view of an exhaust side of the development cooling airflow and the exposure cooling airflow. Note that, in FIG. 18, the flow of air for cooling the development unit 24 is indicated by a solid line, and the flow of air indicated by a solid line is also referred to as the development cooling airflow. In addition, in FIG. 18, the flow of air for cooling the exposure head is indicated by a broken line, and the flow of air indicated by a broken line is also referred to as the exposure cooling airflow The development unit 24 includes the screw 7 rotating at a high speed and the toner circulating at a high speed as described above, and with this operation, frictional heat is generated in the bearing portion of the screw 7 and the toner, and the frictional heat is stored in the development unit 24, and the temperature rises. When the image formation is completed, the heat storage of the development unit 24 is completed, and the development unit 24 is gradually cooled. However, while the image formation is continued, the heat storage is performed as long as the heat capacity of the development unit 24 allows, and the temperature rises. Since the toner has a property of being easily melted by heat, in a case where the temperature of the development unit 24 rises to a certain temperature or higher, the toner is fused inside the development unit 24, and a coating failure of the development sleeve 5 occurs, in a manner that the toner image is disturbed, leading to an image failure.

Accordingly, there is a need for a cooling configuration of the development unit 24 that cools the development unit 24 in a manner that the temperature of the development unit 24 does not rise to a certain temperature or higher.

Since the exposure head 4 dissipates heat according to the emitted light quantity from the LED (light emitting element) 51 and is disposed close to the development unit 24 using toner weak against heat, a cooling portion is required. In particular, in a case where the image forming process is repeated at a high frequency, that is, in a case where the image forming process is used in a device with high productivity, or in a case where an image with high density is continuously output, the light emission time is long, and the emitted light quantity is also large. Therefore, the amount of heat generated from the LED 51 and the circuit on the substrate 50 on which the LED 51 is mounted also increases.

As a countermeasure against this, for example, the housing 54 of the exposure head 4 is also used as a heat sink, and the exposure head 4 is configured in a manner that heat dissipation is easy and heat storage is difficult. However, even in such a case, it is conceivable that the cooling of the exposure head 4 is not in time, heat storage proceeds, and the heat dissipated to the periphery also increases. As a result, the toner around the development sleeve 5 included in the development unit 24 and a part of the circulation toner inside the development unit 24 are fused, which may affect the toner coating layer on the surface of the development sleeve 5, leading to an image defect.

Even in a case where the configuration for cooling the development unit 24 is provided, it is easily assumed that the heat storage caused by the light emission of the LED 51 is superior in a portion where the exposure head 4 of the development unit 24 is close. Therefore, it is desirable to provide a cooling configuration (exposure cooling airflow) of the exposure head 4 for cooling the exposure head 4 and discharging heat to the outside of the apparatus separately from the cooling configuration (development cooling airflow) of the development unit 24 to suppress the amount of heat dissipated to the periphery of the exposure head 4.

Here, in configuring the cooling portion of the exposure head 4, consideration needs to be given from a certain viewpoint. As illustrated in FIG. 8, the development unit 24 and the development sleeve 5 of the development unit 24 are disposed adjacent to the exposure head 4. The surface of the development sleeve 5 is coated with toner, and due to its structure, the toner adheres to the periphery of the bearing portions at both ends of the sleeve, and the toner also adheres to the periphery of the development unit 24. This is because the development sleeve 5 and the screw 7 are rotated at a high speed, the stirred toner goes up, and the toner is separated from the surfaces of the development sleeve 5 and the screw 7. In addition, due to an increase in the internal pressure of the development unit 24 caused by high-speed rotation of the development sleeve 5 and the screw 7, toner may be ejected from the gap of the development unit 24 to the outside.

Therefore, the cooling configuration of the exposure head 4 is desirably a configuration in which these toners are not caught in the exposure cooling airflow and are not mixed. In other words, in configuring the exposure cooling airflow separately from the development cooling airflow, it is desirable that the toner around the development unit 24 adjacent to the exposure head 4 is not caught and not mixed.

From the above, it is preferable that the cooling of the development unit 24 and the cooling of the exposure head 4 are performed in different paths. However, if the cooling paths are configured with different paths, it is necessary to secure two cooling paths, and the configuration of the image forming apparatus becomes complicated. Therefore, in order to simplify the configuration of the image forming apparatus without mixing the scattered toner of the development unit around the exposure head 4, the present embodiment has the following configuration.

First, the exposure cooling airflow will be described with reference to FIG. 18, and next, the development cooling airflow will be described.

(Exposure Cooling Airflow)

First, the exposure cooling airflow will be described. The image forming apparatus 100 includes the exposure head 4, the lifting duct 69, the cartridge tray 30, and the duct unit 60. The exposure head 4 is mounted to the lifting duct 69 disposed in the image forming apparatus 100, and is integrated with the lifting duct 69. When the exposure head 4 is mounted to the lifting duct 69, the opening 55*a* (see FIG. 12) of the housing support member 55 of the exposure head 4 communicates with one opening 69*a* (see FIG. 9) of the lifting duct 69. The lifting duct 69 is disposed between the development support member 301 and the drum support member 302 of the cartridge tray 30 and forms a duct that communicates the exposure head 4 and the duct unit 60 together with the cartridge tray 30. The duct unit 60 is mounted immediately below the cartridge tray 30 with respect to the image forming apparatus 100. In other words, the duct unit 60 is provided on the side opposite to the photosensitive drum 2 across the exposure head 4. When the duct unit 60 is mounted to the image forming apparatus 100, the opening portion 61 (see FIG. 19) of the duct unit 60 communicates with the other opening portion 64 (see FIG. 13) of the lifting duct 69.

In this manner, the housing support member 55, the lifting duct 69, and the cartridge tray 30, and the duct unit 60 of the exposure head 4 form a second cooling duct which is one continuous closed space. Each exposure head 4 is cooled by the exposure cooling airflow (broken lines shown in FIGS. 18 and 22) flowing through the one closed space formed by the housing support member 55, the lifting duct 69, the cartridge tray 30, and the duct unit 60.

As illustrated in FIG. 18, a fan 62 disposed closer to the apparatus front side functions as an intake fan that takes in air (fresh air) outside the apparatus into the duct unit 60. A fan 63 disposed closer to the apparatus back side functions as an exhaust fan that exhausts air inside the duct unit 60 to the outside of the apparatus.

In an exposure cooling airflow indicated by a broken line in FIG. 18, when the fan 62 and the fan 63 rotate, air outside the image forming apparatus is introduced from the intake port 203 through a louver (not illustrated) provided in the exterior cover of the image forming apparatus. As illustrated in FIG. 20, the air introduced from the intake port 203 is exhausted from each exposure intake port 201 through the intake duct 205. The air exhausted from each exposure intake port 201 is blown to the exposure head 4 through the lifting duct 69. As illustrated in FIG. 22, the air blown to the exposure head 4 through the lifting duct 69 circulates from the apparatus front side to the back side along the axial direction of the photosensitive drum 2, and is introduced into the exhaust duct 206 from each exposure exhaust port 202 through the lifting duct 69. As illustrated in FIGS. 22 and 23, air introduced from each exposure exhaust port 202 to the exhaust duct 206 is exhausted from exhaust port 204 of the exhaust duct 206 to the outside of the apparatus through a louver (not illustrated) provided in the exterior cover.

As described above, the duct unit 60, the cartridge tray 30, the lifting duct 69, and the housing support member 55 form a continuous closed space to constitute an exposure cooling airflow. As illustrated in FIGS. 18 and 19, the intake fan 62 and the exhaust fan 63 of the duct unit 60 face the outside of the apparatus only through the exterior cover of the apparatus. The flow path of the exposure cooling airflow is completed by a minimum path formed by directly taking in air from the louver of the exterior cover into the duct unit 60 and directly exhausting air from the duct unit 60. Accordingly, due to the configuration, the intake and exhaust flow hardly affects the atmosphere air inside the apparatus.

(Development Cooling Airflow)

Next, the development cooling airflow will be described. The image forming apparatus 100 includes a fan 40, which is a second fan that generates an airflow for cooling the development unit 24, and a front surface duct 41 for sending air from the outside of the apparatus to each development unit 24. The image forming apparatus 100 includes a development duct that forms a space for circulating air for cooling the development unit 24 along the rotation axis direction of the photosensitive drum 2. That is, the development duct guides the airflow generated by the fan 40 along the rotation axis direction of the development unit 24. Here, a space formed by the base surface of the development unit 24 and the upper surface of the cartridge tray 30 facing the base surface constitutes the development duct.

In the development duct formed by the development unit 24 and the cartridge tray 30, one side in the axial direction which is the apparatus front side communicates with the front surface duct 41. In the development duct, the other side in the axial direction, which is the apparatus back side, communicates with the exhaust duct 206 of the duct unit 60 to form one closed space.

As illustrated in FIG. 19, the exhaust duct 206 includes, for each development unit, a development exhaust port 212 (Y, M, C, and K) as a first development introduction port that communicates with the development duct and introduces air from the development duct. The development exhaust port

212 is provided on the upper surface of the exhaust duct 206 disposed closer to the back side of the image forming apparatus 100.

In addition, the exposure exhaust port 202 for each exposure head and the development exhaust port 212 for each development unit are arranged side by side in the left-right direction (first direction) orthogonal to the axial direction of the photosensitive drum 2 for each image forming portion 1 with respect to the upper surface of the exhaust duct 206.

On the other hand, the development duct of each development unit has an opening 35 (Y, M, C, and K) connected to each development exhaust port 212 of the duct unit 60. The opening 35 (Y, M, C, and K) of each development duct is provided in the cartridge tray 30 for each development unit, and is provided at a position facing each development exhaust port 212 (Y, M, C, and K) of the duct unit 60.

Therefore, the duct unit 60 exhausts the air introduced from the exposure exhaust port 202 of the exposure duct and the air introduced from the development exhaust port 212 of the development duct from the exhaust port 204 to the outside of the apparatus through the exhaust duct 206. That is, the exhaust duct 206 of the duct unit 60 that exhausts the air introduced from each exposure head 4 also serves as an exhaust duct that exhausts the air introduced from the development duct of each development unit.

The fan 40 is provided on the right side of the front surface of the apparatus body of the image forming apparatus 100, and sucks air outside the apparatus from an intake port 101*a* provided on the right side surface side of the image forming apparatus 100 of the front cover 101. The front surface duct 41 is disposed inside the front cover 101 and extends in the left-right direction, which is the direction in which the development units 24 are arranged. The front surface duct 41 has an opening 41*a* at a position corresponding to each development unit 24. Each opening 41*a* of the front surface duct 41 is provided at a position facing an opening 102*c* of each inner door 102 in the axial direction of the photosensitive drum, and communicates with each other by closing the front cover 101. The opening 102*c* of each inner door 102 is provided at a position corresponding to the opening on one end side in the longitudinal direction of the development duct of each development unit 24, and communicates with each other by closing the inner door 102.

The opening 35 (Y, M, C, and K) of each development duct is provided closer to the apparatus back side in the axial direction of the photosensitive drum 2. When the duct unit 60 is mounted to the image forming apparatus 100, the opening 35 (Y, M, C, and K) of each development duct communicates with each development exhaust port 212 (Y, M, C, and K) of the exhaust duct 206 provided at a position corresponding to each opening 35.

As described above, the development duct, which is a closed space formed between the development unit 24 and the cartridge tray 30, forms a part of a duct, which is one closed space communicating with the front surface duct 41 and the exhaust duct 206 of the duct unit 60. The development duct formed between the development unit 24 and the cartridge tray 30, and the front surface duct 41 and the exhaust duct 206 of the duct unit 60 communicating with the development duct form a first cooling duct that is the one closed space serving as a flow path of the development cooling airflow.

As illustrated in FIG. 18, the fan 40 disposed closer to the right side of the apparatus front surface functions as an intake fan that takes in air (fresh air) outside the apparatus into the apparatus. On the other hand, the fan 63 disposed closer to the apparatus back side in the duct unit functions as an exhaust fan that exhausts air inside the duct unit 60 to the outside of the apparatus, similarly to the exposure cooling airflow.

In the development cooling airflow indicated by the solid line in FIG. 18, when the fan 40 and the exhaust fan 63 rotate, air outside the apparatus is introduced from the intake port 101*a* provided in the front cover 101 of the image forming apparatus. The air introduced from the intake port 101*a* is introduced into the development duct of each development unit via each opening 41*a* of the front surface duct 41 disposed inside the front cover 101 and the opening 102*c* of each inner door 102. As illustrated in FIG. 21, the air introduced into the development duct of each development unit circulates from the apparatus front side to the apparatus back side along the axial direction of the photosensitive drum 2, and is introduced into the exhaust duct 206 from each development exhaust port 212 through the opening 35 of each development duct. As illustrated in FIGS. 22 and 23, air introduced from each development exhaust port 212 to the exhaust duct 206 is exhausted from exhaust port 204 of the exhaust duct 206 to the outside of the apparatus through a louver (not illustrated) provided in the exterior cover.

As described above, according to the present embodiment, the exhaust duct 206 of the duct unit 60 that exhausts the air introduced from each exposure head 4 also serves as an exhaust duct that exhausts the air introduced from the development duct of each development unit. In other words, the exhaust fan 63 and the exhaust duct 206 are made common. As a result, the air circulating through the development duct to cool the development unit 24 and the air circulating through the exposure duct to cool the exposure head 4 join the exhaust duct 206 of the duct unit 60, and are exhausted from the same exhaust port 204 to the outside of the apparatus by the same exhaust fan 63. That is, even if the exposure duct forming the path for cooling the exposure head 4 is provided separately from the development duct forming the path for cooling the development unit 24, the configuration of the image forming apparatus can be simplified by making the exhaust fan and a part of the duct (exhaust duct) common. In addition, it is possible to realize space saving inside the image forming apparatus by performing exhaust by merging the ducts into one exhaust duct.

Note that, in a case where the intake fan and the exhaust fan are used with the same strength, since there is only one exhaust air for the intake air on the development unit side and the intake air on the exposure head side, the exhaust capacity becomes smaller than the intake capacity. In this case, air that cannot be exhausted from the exhaust fan may leak out of the path through a gap in the path. Therefore, it is desirable that the intake amount and the exhaust amount of the cooling configuration of the development unit and the exposure head are equal to each other.

In addition, in the above-described embodiment, the image forming apparatus adopting the lower surface exposure has been described as an example, but the configuration according to the present invention is not limited to this embodiment. For example, an image forming apparatus employing upper surface exposure may be used. In this case, a photosensitive drum is disposed on an upper portion of the intermediate transfer belt, and an exposure head is further disposed on the upper portion of the photosensitive drum, and the upper and lower sides of the photosensitive drum are all opposite to those of the image forming apparatus adopting the lower surface exposure.

In addition, the image forming apparatus is not limited to a laser type image forming apparatus, and may be an inkjet type image forming apparatus or another type image forming apparatus.

Furthermore, note that the operation of the rotary arm 65 that moves the exposure head 4 to the exposure position or the retraction position is powered by the movement of the development stay 31 that moves the development unit 24 to the development position or the separated position, but may be powered via another member linked with the inner door 102.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-153984, filed Sep. 27, 2022, which is hereby incorporated by reference herein in its entirety.

What is claimed is:

1. An image forming apparatus comprising:

a rotating photoreceptor;

an exposure portion configured to include a substrate having a plurality of light emitting portions arranged along a rotation axis direction of the photoreceptor and exposes the photoreceptor to form a latent image on the photoreceptor;

a development portion configured to develop a latent image formed on the photoreceptor with toner;

a first fan configured to generate an airflow for cooling the exposure portion;

an exposure duct configured to guide the airflow generated by the first fan along a longitudinal direction of the substrate;

a second fan configured to generate an airflow for cooling the development portion;

a development duct configured to guide the airflow generated by the second fan along the rotation axis direction of the development portion; and a first duct communicating with the exposure duct and the development duct, the first duct configured to exhaust air introduced from the exposure duct and exhaust air introduced from the development duct.

2. The image forming apparatus according to claim 1, comprising:

a second duct configured to communicate with the exposure duct and is provided with the first fan, wherein the second duct guides an airflow generated by the fan to the exposure duct.

3. The image forming apparatus according to claim 2, wherein the first duct has an exhaust port that faces an outer surface of the image forming apparatus and exhausts air to an outside of the image forming apparatus, and the second duct has an intake port that faces the outer surface of the image forming apparatus and takes in air from an outside of the image forming apparatus.

4. The image forming apparatus according to claim 3, wherein the exhaust port and the intake port are provided on a same surface side of the image forming apparatus.

5. The image forming apparatus according to claim 2, wherein the first duct is provided on one side of a center in an axial direction of the photoreceptor, and the second duct is provided on the other side of the center in the axial direction of the photoreceptor.

6. The image forming apparatus according to claim 1, wherein the first duct includes an exposure introduction port through which air of the exposure duct is introduced and a development introduction port through which air of the development duct is introduced, and the exposure introduction port and the development introduction port are arranged side by side in a first direction orthogonal to an axial direction of the photoreceptor with respect to the first duct.

7. The image forming apparatus according to claim 1, wherein an exposure cooling unit is provided on a side opposite to the photoreceptor with the exposure portion interposed between.

8. The image forming apparatus according to claim 1, wherein the plurality of light emitting portions is organic EL.

* * * * *